(12) United States Patent
Sakuma

(10) Patent No.: US 11,709,177 B2
(45) Date of Patent: Jul. 25, 2023

(54) INERTIAL MEASUREMENT UNIT, ELECTRONIC INSTRUMENT, AND MOVING OBJECT

(71) Applicant: Seiko Epson Corporation, Tokyo (JP)

(72) Inventor: Masayasu Sakuma, Shiojiri (JP)

(73) Assignee: SEIKO EPSON CORPORATION

( * ) Notice: Subject to any disclaimer, the term of this patent is extended or adjusted under 35 U.S.C. 154(b) by 256 days.

(21) Appl. No.: 17/081,044

(22) Filed: Oct. 27, 2020

(65) Prior Publication Data

US 2021/0123943 A1 Apr. 29, 2021

(30) Foreign Application Priority Data

Oct. 28, 2019 (JP) .................................. 2019-194914

(51) Int. Cl.
*G01P 15/08* (2006.01)
*H01R 12/57* (2011.01)
*H01R 12/52* (2011.01)

(52) U.S. Cl.
CPC .............. *G01P 15/08* (2013.01); *H01R 12/57* (2013.01); *H01R 12/52* (2013.01); *H01R 2201/20* (2013.01)

(58) Field of Classification Search
CPC ........ G01P 15/08; G01P 15/18; G01P 15/125; H01R 12/57; H01R 12/52; H01R 2201/20; G01C 19/5769; G01C 19/5747
See application file for complete search history.

(56) References Cited

U.S. PATENT DOCUMENTS

| | | | |
|---|---|---|---|
| 2007/0044558 A1* | 3/2007 | Ohta | ...................... G01C 19/56 73/493 |
| 2016/0029484 A1 | 1/2016 | Kondo | |
| 2017/0018471 A1* | 1/2017 | Aono | ........................ G01L 9/02 |

FOREIGN PATENT DOCUMENTS

| | | |
|---|---|---|
| CN | 105306002 A | 2/2016 |
| JP | 2016-138774 A | 8/2016 |

* cited by examiner

*Primary Examiner* — Xin Y Zhong
(74) *Attorney, Agent, or Firm* — Harness, Dickey & Pierce, P.L.C.

(57) ABSTRACT

An inertial measurement unit includes a sensor module including at least one inertial sensor and a printed substrate on which the inertia sensor is provided, and a lead group provided as a support member for supporting the printed substrate on an attachment surface, and leads of the lead group each have a first section coupled to the attachment surface, a second section extending from the first section toward the printed substrate in a direction that intersects the attachment surface, and a third section coupled to the printed substrate.

19 Claims, 16 Drawing Sheets

| | HIGH-MELTING-POINT SOLDER | | BRAZING MATERIAL | | |
|---|---|---|---|---|---|
| | Sn/Sb5 | Sn/Sb10 | GOLD BRAZING MATERIAL | SILVER BRAZING MATERIAL | COPPER BRAZING MATERIAL |
| MELTING POINT | HIGHER THAN OR EQUAL TO 240°C | HIGHER THAN OR EQUAL TO 245°C | HIGHER THAN OR EQUAL TO 800°C | HIGHER THAN OR EQUAL TO 600°C | HIGHER THAN OR EQUAL TO 600°C |

INERTIAL MEASUREMENT UNIT, ELECTRONIC INSTRUMENT, AND MOVING OBJECT

The present application is based on, and claims priority from JP Application Serial Number 2019-194914, filed Oct. 28, 2019, the disclosure of which is hereby incorporated by reference herein in its entirety.

BACKGROUND

1. Technical Field

The present disclosure relates to an inertial measurement unit, an electronic instrument, a moving object, and the like.

2. Related Art

JP-A-2016-138774 discloses a sensor apparatus including a geomagnetism sensor. In the sensor apparatus, the magnetism sensor is mounted on a sensor attachment surface of the substrate, and an electrode section of a ball grid array (BGA) is formed on the bottom surface of the substrate.

On the other hand, there has been a known inertial measurement unit including an inertial sensor, such as an acceleration sensor and a gyro sensor. To attach the inertial measurement unit to an attachment target substrate that is a customer substrate, it is conceivable to employ a method for forming a BGA on the bottom surface of a substrate of the inertial measurement unit and mounting the inertial measurement unit on the attachment target substrate, as in JP-A-2016-138774 described above.

It has been, however, shown that when the substrate of the inertial measurement unit is mounted, for example, on the attachment target substrate having a coefficient of linear expansion different from that of the substrate, stress induced in the substrate of the inertial measurement unit could cause deterioration of the sensor characteristics of the inertial sensor. Further, the stress could lower the reliability of the substrate mounting performed, for example, by solder.

SUMMARY

An aspect of the present disclosure relates to an inertial measurement unit including a sensor module including at least one inertial sensor and a printed substrate on which the inertia sensor is provided, and a lead group provided as a support member for supporting the printed substrate on an attachment surface, and leads of the lead group each have a first section coupled to the attachment surface, a second section extending from the first section toward the printed substrate in a direction that intersects the attachment surface, and a third section coupled to the printed substrate.

DESCRIPTION OF EXEMPLARY EMBODIMENTS

An embodiment of the present disclosure will be described below. It is not intended that the present embodiment described below unduly limits the contents set forth in the appended claims. Further, all configurations described in the present embodiment are not necessarily essential configuration requirements.

1. Inertial Measurement Unit

Figure 1:
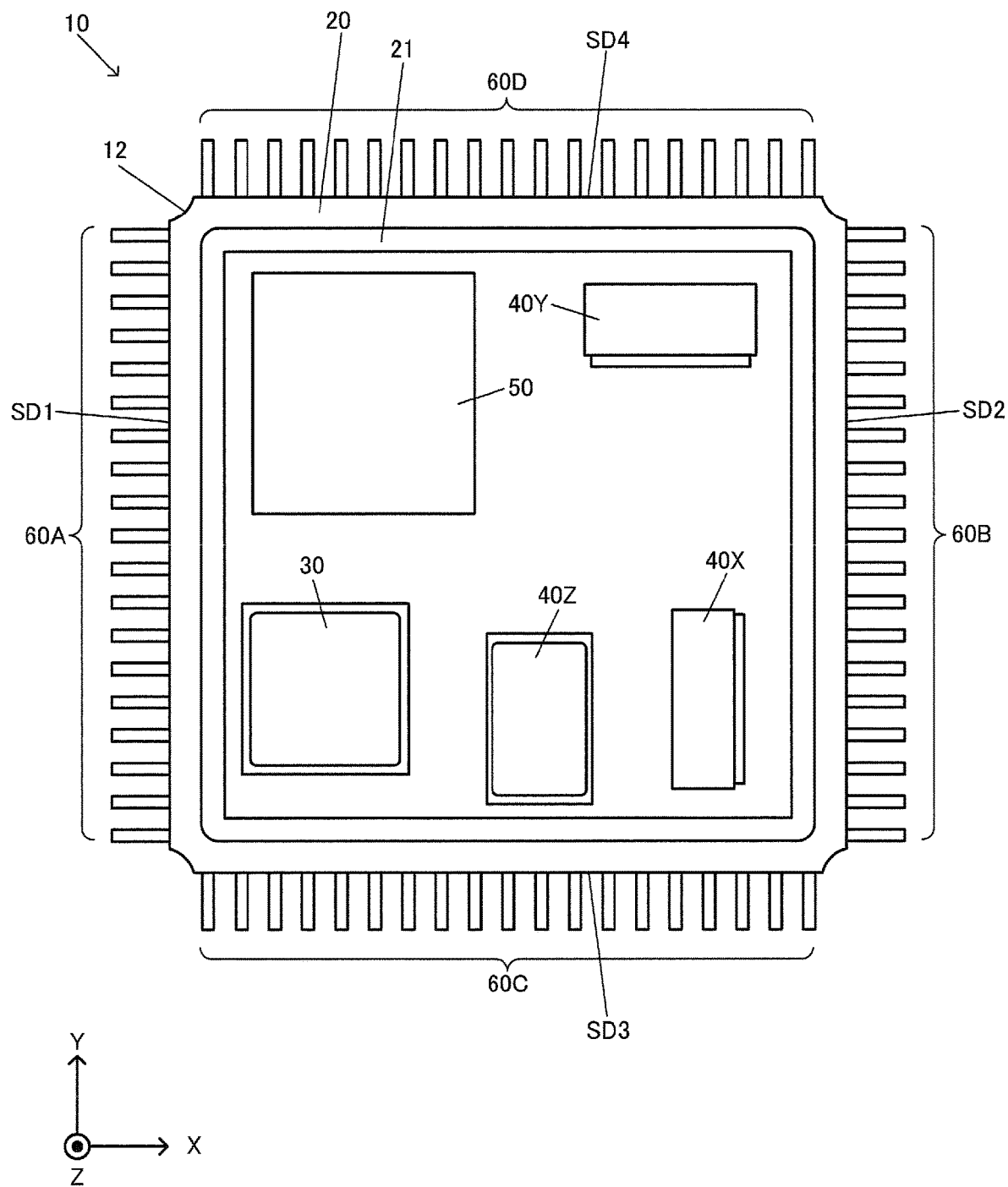
FIG. 1 is a plan view showing an example of the configuration of an inertial measurement unit according to an embodiment of the present disclosure.
Figure 2:
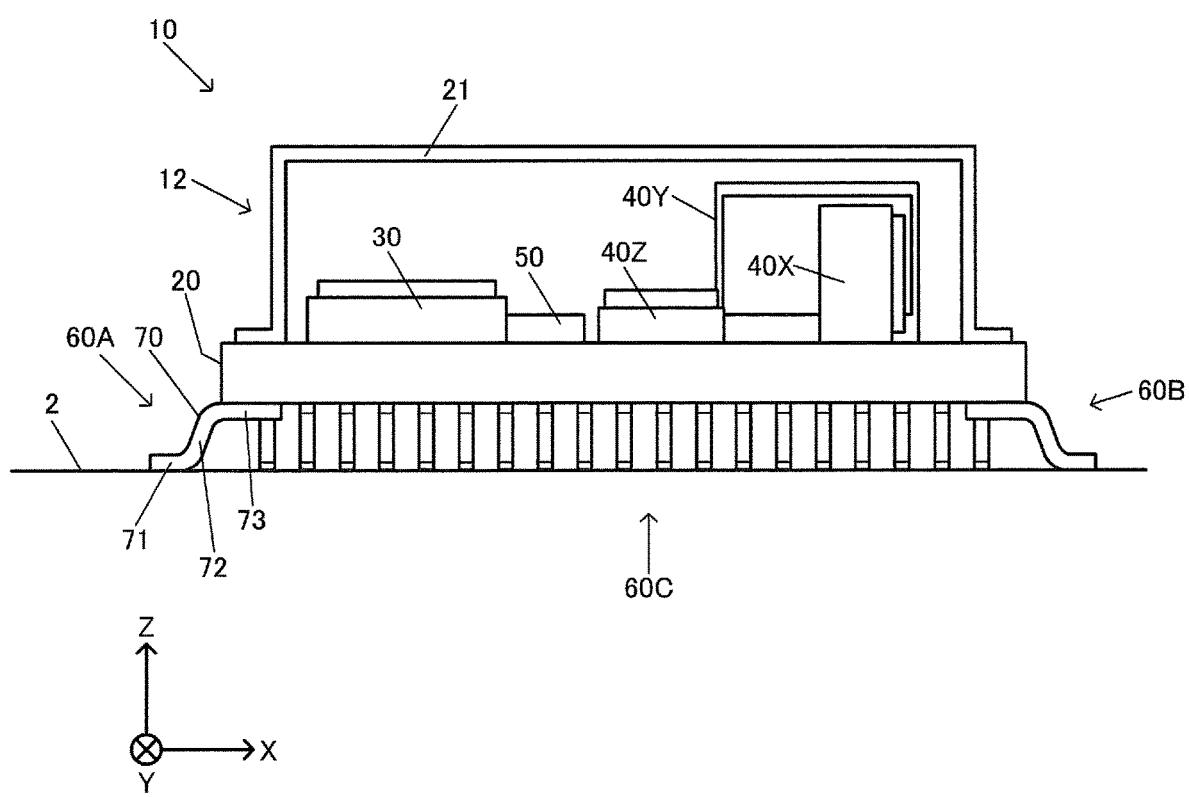
FIG. 2 is a side view showing the example of the configuration of the inertial measurement unit according to the embodiment.
Figure 3:
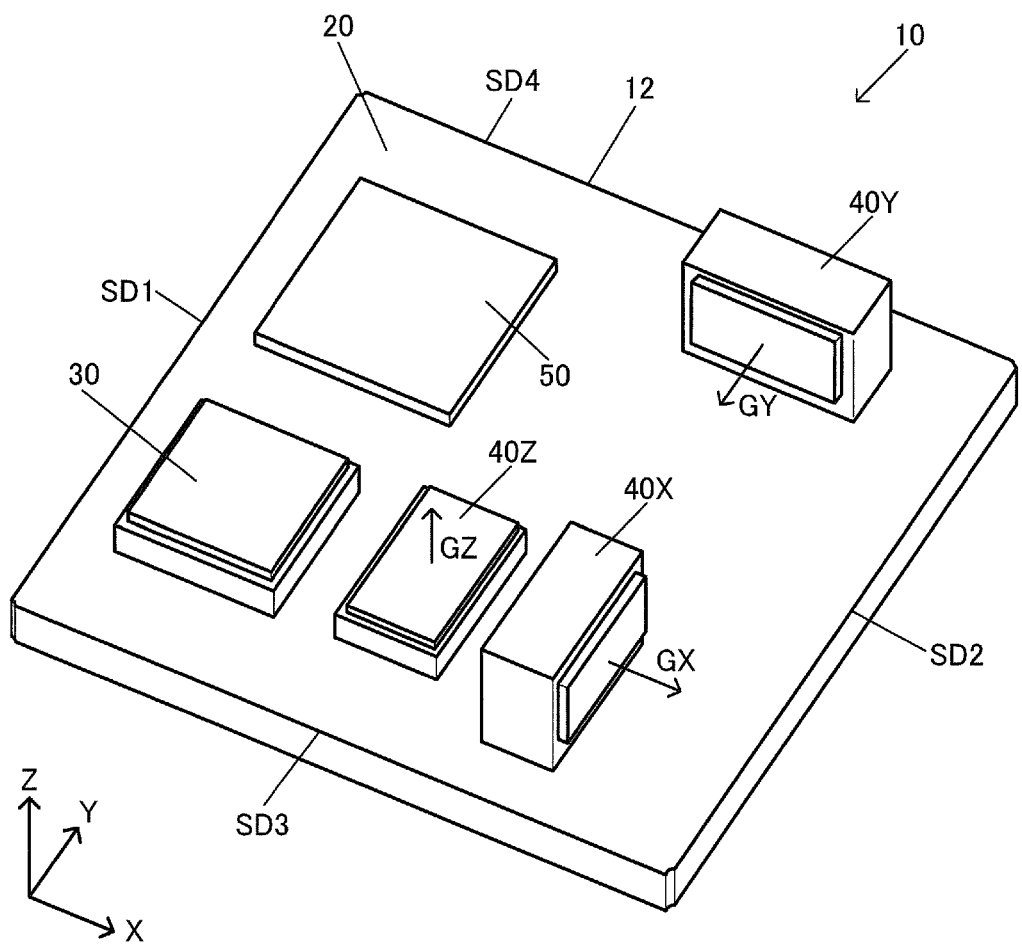
FIG. 3 is a perspective view showing the example of the configuration of the inertial measurement unit according to the embodiment.

FIG. 1 is a plan view showing an example of the configuration of an inertial measurement unit 10 according to the present embodiment, and FIG. 2 is a side view of the example of the configuration of the inertial measurement unit 10. FIG. 3 is a perspective view of a sensor module 12 including inertial sensors and a printed substrate 20. The inertial measurement unit 10 according to the present embodiment, which is an inertial measurement unit (IMU), includes the sensor module 12 and lead groups 60A, 60B, 60C, and 60D. The sensor module 12 includes at least one inertial sensor and the printed substrate 20, on which the inertial sensor is provided. The printed substrate 20 is a substrate in the broad sense. The lead groups 60A to 60D are provided as a support member for supporting the printed substrate 20 of the sensor module 12 on an attachment surface. The lead groups 60A to 60D also function as signal terminals that allow the sensor module 12 to input and output signals from and to an external component. In FIGS. 1 to 3, axes X and Y are axes parallel to the principal surface of the printed substrate 20 of the sensor module 12 and perpendicular to each other. An axis Z is an axis perpendicular to the principal surface of the printed substrate 20 and perpendicular to the axes X and Y. For example, the axis X is a first axis, the axis Y is a second axis, and the axis Z is a third axis. The principal surface of the printed substrate 20 is the upper or bottom surface of the printed substrate 20. The printed substrate 20 is a rectangular substrate having an edge SD1, an edge SD2, which faces the edge SD1, an edge SD3, which is perpendicular to the edges SD1 and SD2, and an edge SD4, which faces the edge SD3. The edges SD1, SD2, SD3, and SD4 are first, second, third, and fourth edges, respectively. For example, the axis X is the direction from the edge SD1 toward the edge SD2, and the axis Y is the direction from the edge SD3 toward the edge SD4. The axis Z is the direction from an attachment surface 2, which is shown in FIG. 2 and to which the inertial measurement unit 10 is attached, toward the printed substrate 20. The attachment surface 2 is, for example, a surface of an attachment target substrate or any other substrate to which the inertial measurement unit 10 is attached, and the attachment target substrate is, for example, a customer substrate used by a customer of the inertial measurement unit 10.

The sensor module 12 is a module part including at least one inertial sensor. In FIGS. 1 to 3, an acceleration sensor 30 and gyro sensors 40X, 40Y, and 40Z are provided as the at least one inertial sensor on the printed substrate 20, which is a substrate of the sensor module 12. The gyro sensors 40X, 40Y, and 40Z are each an angular velocity sensor.

The acceleration sensor 30 is, for example, a sensor that detects acceleration in the X-axis direction, acceleration in the Y-axis direction, and acceleration in the Z-axis direction. The acceleration sensor 30 may, for example, be a sensor capable of detecting acceleration in the direction of at least one or in the directions of at least two of the axes X, Y, and Z. An acceleration sensor that detects acceleration in the direction of one or in the directions of two of the axes X, Y, and Z may be individually provided. For example, three acceleration sensors that detect acceleration in the directions of the axes X, Y, and Z may be provided, or an acceleration sensor that detects acceleration in the directions of the axes X and Y and an acceleration sensor that detects acceleration in the direction of the axis Z may be provided.

The gyro sensor 40X detects angular velocity around the axis X. For example, the gyro sensor 40X has a detection axis GX so set as to extend in the direction of the axis X, which is the first axis, and detects angular velocity around the axis X, as shown in FIG. 3. The gyro sensors 40Y and 40Z detect angular velocity around the axes Y and Z, respectively. For example, the gyro sensor 40Y has a detection axis GY so set as to extend in the direction of the axis Y, which is the second axis, and detects angular velocity around the axis Y. The gyro sensor 40Z has a detection axis GZ so set as to extend in the direction of the axis Z, which is the third axis, and detects angular velocity around the axis Z. For example, the gyro sensors 40X, 40Y, and 40Z are so mounted on the printed substrate 20 that the detection axes GX, GY, and GZ thereof extend along the directions of the axes X, Y, and Z, respectively. The gyro sensors 40X, 40Y, and 40Z are driven at drive frequencies different from one another, such as first, second, and third drive frequencies, to detect the angular velocity.

In FIGS. 1 to 3, the acceleration sensor and the gyro sensors are both provided as the inertial sensor on the printed substrate 20, and only one of the acceleration sensor and the gyro sensors may be provided. The inertial sensor is not limited to an acceleration sensor or a gyro sensor and only each needs to be a sensor capable of detecting information on inertia based on any detection method and may be a physical quantity sensor capable of detecting a physical quantity equivalent to acceleration or angular velocity. For example, the inertial sensor may be a physical quantity sensor capable of detecting a physical quantity, such as velocity and angular acceleration. In the present embodiment, an acceleration sensor and a gyro sensor are collectively called an inertial sensor as appropriate.

The printed substrate 20 is a substrate on which electronic parts are mounted, for example, a substrate that is a plate which is formed of an insulator and on which or in which conductor wiring is formed. The printed substrate 20, which is a circuit substrate, is a rigid substrate, desirably, a multilayer wiring substrate.

In the present embodiment, the printed substrate 20 is, for example, a ceramic substrate. For example, the printed substrate 20 is a glass ceramic substrate or an alumina ceramic substrate, such as a low-temperature simultaneously sintered ceramic substrate. In this case, the inertial sensors, such as the acceleration sensor 30 and the gyro sensors 40X, 40Y, and 40Z, are each desirably an inertial sensor accommodated in a ceramic package. The ceramic material of which the package is made is, for example, alumina or aluminum nitride. The ceramic package includes, for example, a container and a lid, and an inertial sensor is accommodated and encapsulated in an accommodation space formed by the container and the lid. Using a ceramic substrate as the printed substrate 200 and using an inertial sensor accommodated in a ceramic package as described above allow the difference in the coefficient of linear expansion between the printed substrate 20 and the inertial sensor to be sufficiently small. Deterioration of the detection characteristics of the inertial sensor due to stress resulting from the difference in the coefficient of linear expansion and a decrease in the reliability of mounting the inertial sensor on the printed substrate 20 can therefore be suppressed.

The printed substrate 20 can instead be a resin substrate, such as a glass epoxy substrate and a BT substrate using BT resin (bismaleimide-triazine-based resin) manufactured by MITSUBISHI GAS CHEMICAL COMPANY, INC. The difference in the coefficient of linear expansion between the resin substrate and the ceramic package is desirably 30% or smaller, more desirably, 20% or smaller, further desirably, 10% or smaller. The difference in the coefficient of linear expansion between the printed substrate 20 and the inertial sensor can thus be sufficiently small. Deterioration of the detection characteristics of the inertial sensor and a decrease in the reliability of mounting the inertial sensor on the printed substrate 20 due to stress resulting from the difference in the coefficient of linear expansion can therefore be suppressed.

The sensor module 12 is a module part formed of the inertial sensor and the printed substrate 20 integrated with each other. The sensor module 12 includes the printed substrate 20, the inertial sensor, such as the acceleration sensor 30 and the gyro sensors 40X, 40Y, and 40Z mounted on the printed substrate 20, and an enclosure 21, as shown, for example, in FIGS. 1 and 2. The enclosure 21 is intended to encapsulate the inertial sensors, such as the acceleration sensor 30 and the gyro sensors 40X, 40Y, and 40Z, and mounted parts that are electronic parts, such as the inertial sensors, are accommodated in an accommodation space formed by the printed substrate 20 and the enclosure 21. The enclosure 21 is intended to encapsulate the inertial sensor, such as the acceleration sensor 30 and the gyro sensors 40X, 40Y, and 40Z, and mounted parts that are electronic parts, such as the inertial sensors, are accommodated in an accommodation space formed by the printed substrate 20 and the enclosure 21. For example, the printed substrate 20 and the enclosure 21 form a package of the sensor module 12. The enclosure 21 is formed of an electrically conductive member made, for example, of a metal. The package of the sensor module 12 may instead be achieved by resin molding.

The sensor module 12 can further include a processing section 50. The processing section 50 is mounted on the printed substrate 20 and carries out processes based on information detected with the inertial sensors. The processing section 50 is a processing circuit and can be achieved by a processor, for example, an MPU and a CPU. The processing section 50 may instead be achieved by an ASIC (application specific integrated circuit) formed by automatically placed wiring, such as a gate array. Further, circuit parts, for example, resisters and capacitors are mounted as the mounted parts on the printed substrate 20.

The inertial measurement unit 10 according to the present embodiment thus includes the sensor module 12, which includes at least one inertial sensor and the printed substrate 20, on which the inertial sensor is provided, and the lead groups 60A, 60B, 60C, and 60D, which are provided as the support member for supporting the printed substrate 20 of the sensor module 12 on the attachment surface 2. The lead groups 60A, 60B, 60C, and 60D also function as a signal terminal group for the sensor module 12. The lead groups 60A, 60B, 60C, and 60D are first, second, third, and fourth lead groups, respectively. The entirety or part of the lead groups 60A, 60B, 60C, and 60D is hereinafter collectively referred to as a lead group 60 as appropriate. Leads 70 of the lead group 60 each have a first section 71, a second section 72, and a third section 73, as shown in FIG. 2.

Figure 4:
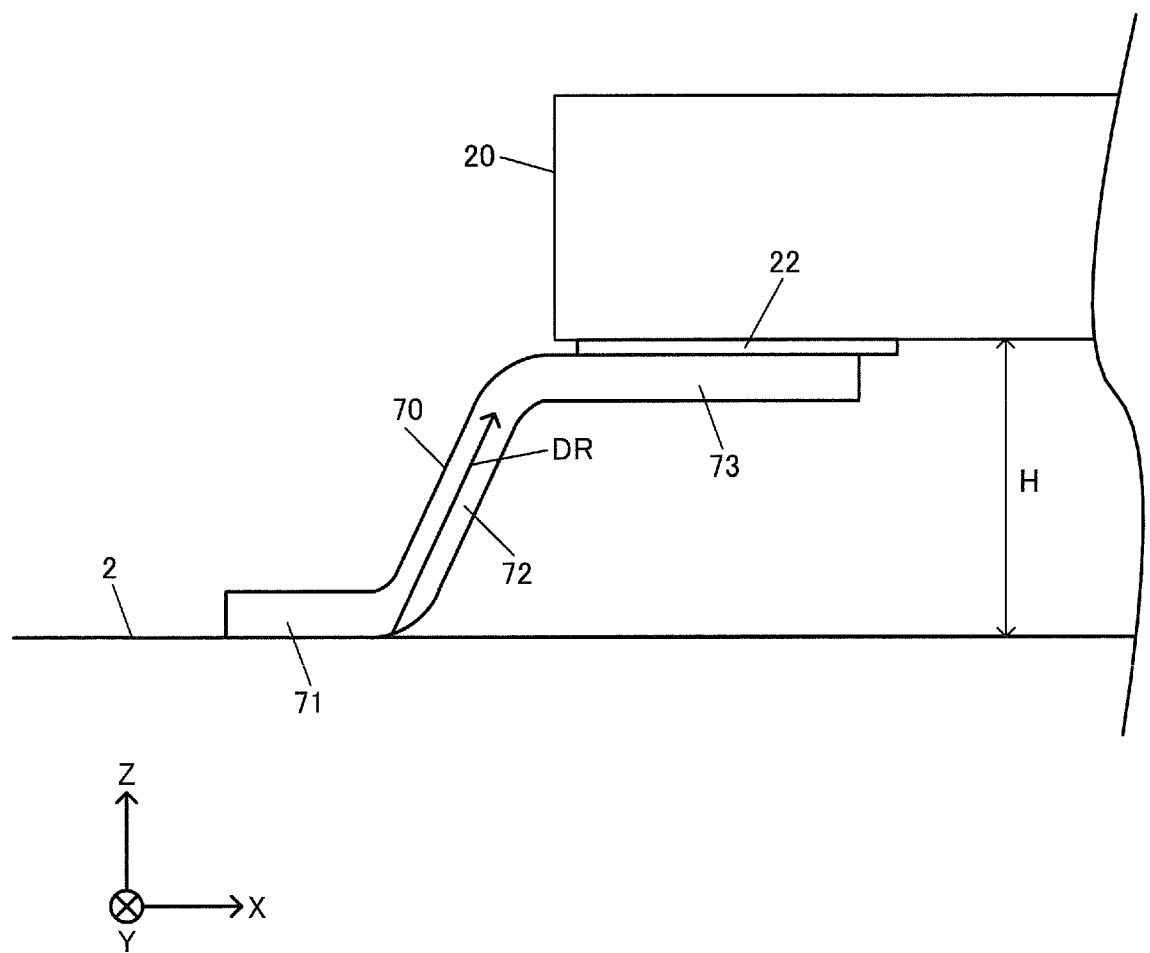
FIG. 4 describes leads that form a support member.

FIG. 4 describes the leads 70, which form the support member, in detail. The leads 70 are formed, for example, by cutting a lead frame at the time of manufacture of the inertial measurement unit 10. The leads 70 may be made of an iron-based material or a copper-based material.

The leads 70 each have the first section 71, which is coupled to the attachment surface 2. That is, the first section 71 of each of the leads 70 is a portion capable of being coupled to the attachment surface 2, which is a surface of the attachment target substrate, to which the inertial measurement unit 10 is attached. The first section 71 is coupled to a connection terminal formed on the attachment target substrate, for example, by using solder. The attachment target substrate is, for example, a customer substrate used by the customer of the inertial measurement unit 10.

The leads 70 each have the second section 72, which extends from the first section 71 toward the printed substrate 20 in a direction DR, which intersects the attachment surface 2. For example, the direction DR is a direction that inclines with respect to the attachment surface 2 by an acute angle in FIG. 4. The direction DR may instead be perpendicular to the attachment surface 2. The second section 72 of each of the leads 70 is the portion between the first section 71 and a third section 73, for example, a bent portion between the first section 71 and a third section 73.

Figure 9:
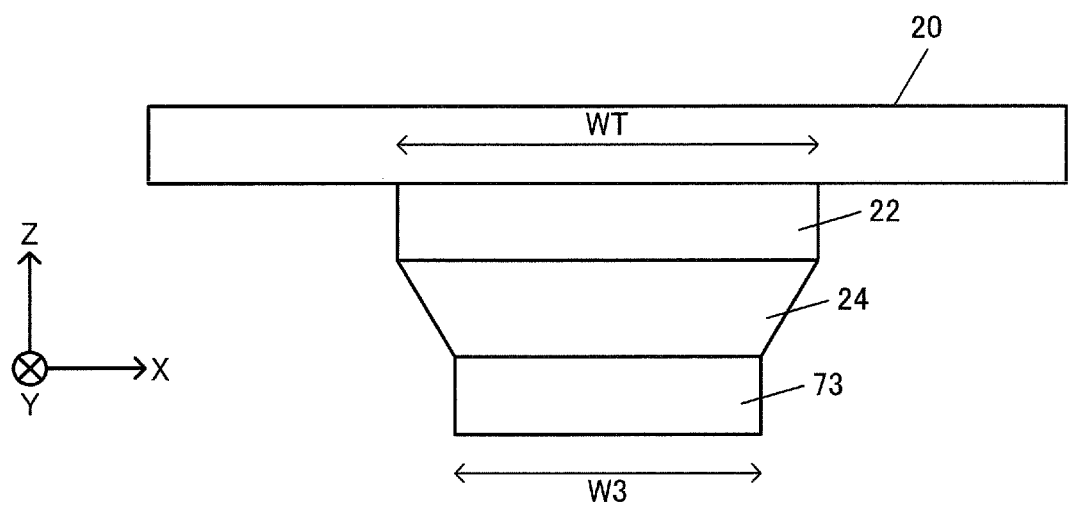
FIG. 9 describes a method for coupling the external connection terminal to the lead by using solder.

The leads 70 each have the third section 73, which is coupled to the printed substrate 20. Specifically, the third section 73 is coupled to an external connection terminal 22 provided on the bottom surface of the printed substrate 20. That is, the third section 73 of each of the leads 70 is a portion cable of being coupled to the external connection terminal 22 provided on the bottom surface of the printed substrate 20. The third section 73 is coupled to the external connection terminal 22 on the printed substrate 20, for example, by using solder 24, as shown in FIG. 9, which will be described later. Specifically, the third section 73 is coupled to the external connection terminal 22 by using the solder 24, which is high-melting-point solder having a melting point higher than that of the solder used to couple the first section 71. The third section 73 may instead be coupled to the external connection terminal 22 by using a brazing material.

In the present embodiment, the leads 70, which each have the thus configured first section 71, second section 72, and third section 73, are used as the support member to support the printed substrate 20 of the sensor module 12 at a height H from the attachment surface 2, as shown in FIG. 4. The height H is, for example, at least 1.7 mm, as will be described later.

Figure 5:
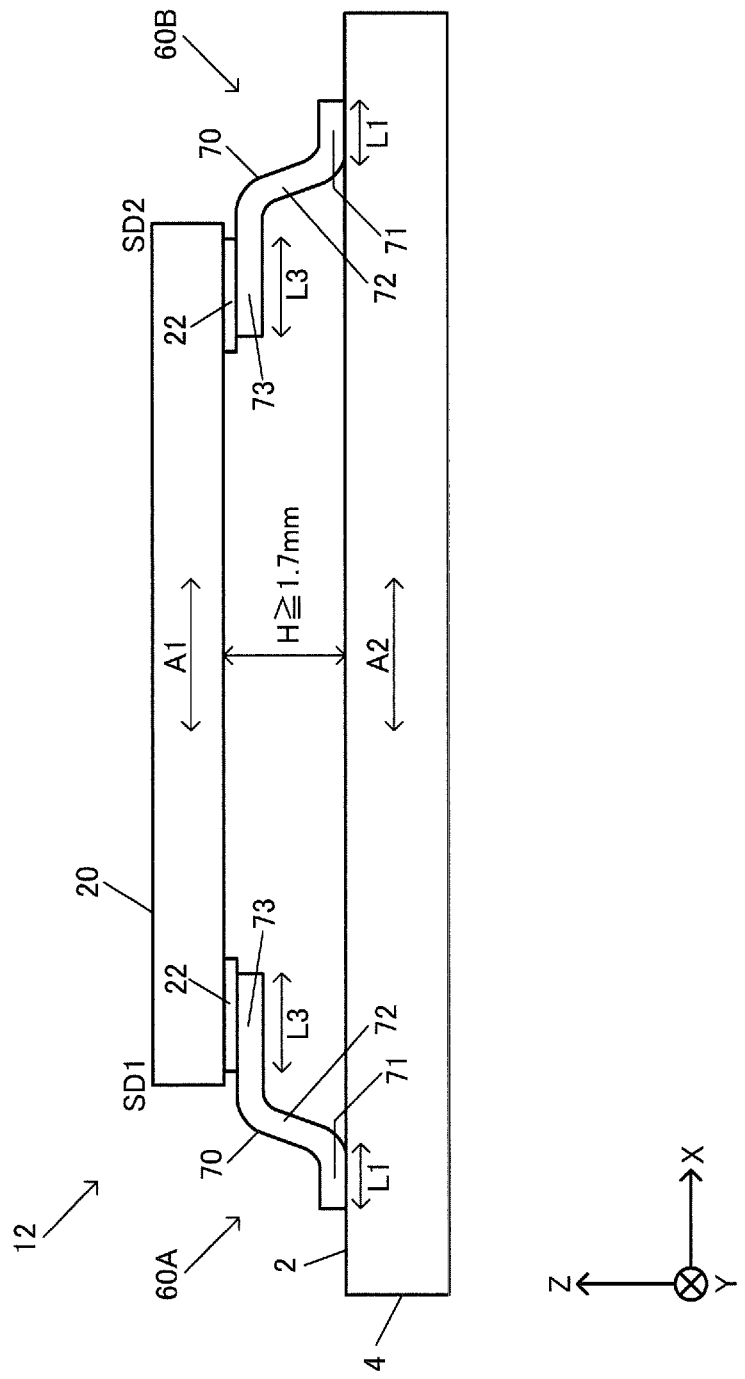
FIG. 5 shows a case where gullwing-type leads are used.
Figure 6:
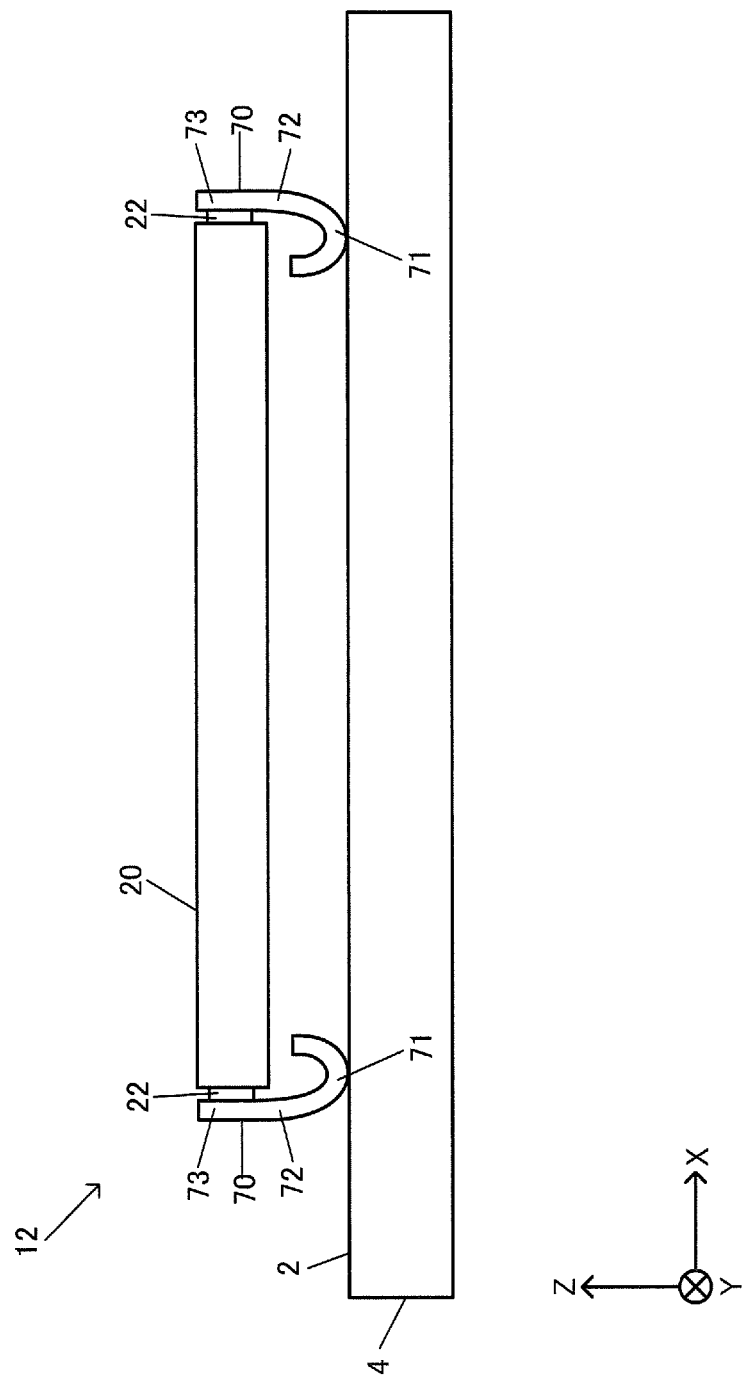
FIG. 6 shows a case where J-lead-type leads are used.
Figure 7:
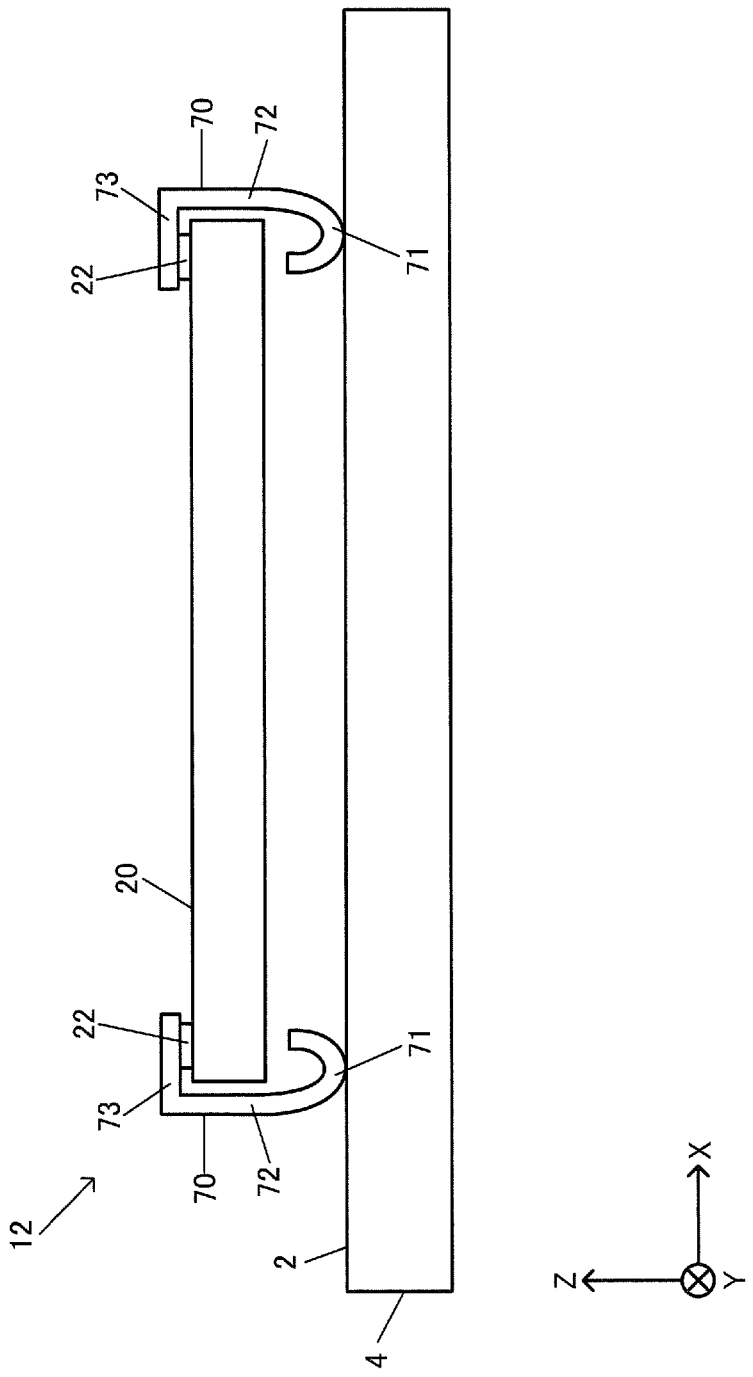
FIG. 7 shows another case where J-lead-type leads are used.

FIG. 5 describes how the leads 70 support the printed substrate 20 of the sensor module 12. FIG. 5 shows a case where the leads 70 are each a gullwing-type lead. The leads 70 may each instead be a J-lead-type lead, as shown in FIGS. 6 and 7, which will be described later.

In FIG. 5, for example, the leads 70 of the lead group 60A and the leads 70 of the lead group 60B are used as the support member to support the printed substrate 20 of the sensor module 12 on the attachment surface 2 of a substrate 4. The substrate 4 is, for example, the attachment target substrate to which the inertial measurement unit 10 is attached, for example, a customer substrate.

For example, the inertial measurement unit 10 in related art has not employed a method for directly mounting the printed substrate 20, on which an inertial sensor is mounted, on the substrate 4, such as a customer substrate. The inertial measurement unit 10 is electrically coupled to an external apparatus, for example, by providing the sensor module 12 with a male connector, coupling a female connector at one end of a cable to the male connector, and coupling the other end of the cable to the external apparatus via a connector or any other component. The result of the measurement performed by the inertial measurement unit 10 is then outputted to the external apparatus via the cable.

The cable-based coupling described above is, however, not preferable from the viewpoint of reliability, and coupling using, for example, solder is required, for example, in an in-vehicle instrument. It is therefore desired to directly mount the printed substrate 20 of the sensor module 12 onto the substrate 4, which is a customer substrate.

The coefficient of linear expansion of the printed substrate 20, however, differs from the coefficient of linear expansion of the substrate 4, for example, in FIG. 5. For example, since the substrate 4 is a substrate used by the customer, a variety of types of substrate are used in accordance with the customer. It is therefore difficult to achieve a state in which the coefficients of linear expansion of the printed substrate 20 and the substrate 4 are equal to each other. When the coefficients of linear expansion differ from each other, the displacement of the printed substrate 20, for example, in a direction A1 and the displacement of the substrate 4, for example, in a direction A2 due, for example, to heat undesirably differ from each other. Stress is therefore induced, for example, in the printed substrate 20 of the sensor module 12 due to the difference in the coefficient of linear expansion between the printed substrate 20 and the substrate 4, and the sensor characteristics of the inertial sensor undesirably deteriorate. For example, in the case of a MEMS (micro electro mechanical systems) capacitance-type acceleration sensor, such as those shown in FIGS. 14 and 15, which will be described later, the stress induced in the printed substrate 20 by the difference in the coefficient of linear expansion changes the capacitance, resulting in a problem of deterioration of the sensor characteristics of the acceleration sensor. Further, another problem occurs with the gyro sensors, such as a shift of the detection axes thereof, resulting in deterioration of the sensor characteristics of the gyro sensors.

For example, a method for coupling the printed substrate 20 to the substrate 4 by using a BGA, as in JP-A-2016-138774 described above, however, does not allow the BGA coupling portion to absorb the stress induced by the difference in the coefficient of linear expansion. The stress is therefore induced in the printed substrate 20, resulting in deterioration of the sensor characteristics of the inertial sensor. Further, the stress acting on the BGA junction causes the solder to crack or otherwise break, resulting in deterioration of the solder mounting reliability.

To solve the problems described above, the inertial measurement unit 10 according to the present embodiment includes the sensor module 12, which includes at least one inertial sensor and the printed substrate 20, on which the inertial sensor is provided, and the lead group 60, which is provided as the support member for supporting the printed substrate 20 on the attachment surface 2. The lead group 60 is formed, for example, of the lead groups 60A to 60D. The leads 70 of the lead group 60 each have the first section 71, which is coupled to the attachment surface 2, the second section 72, which extends from the first section 71 toward the printed substrate 20 in the direction DR, which intersects the attachment surface 2, and the third section 73, which is coupled to the printed substrate 20, as described with reference to FIGS. 4 and 5.

According to the thus configured inertial measurement unit 10, the lead group 60, which functions as the support member, can be used to support the printed substrate 20 of the sensor module 12, in which the inertia sensor, such as the acceleration sensor 30 and the gyro sensors 40X, 40Y, and 40Z, is provided. Further, using the lead group 60 as the signal terminal group allows signal communication between the sensor module 12 and the external apparatus. The leads 70 of the lead group 60 each have the first section 71, which is coupled to the attachment surface 2, the third section 73, which is coupled to the printed substrate 20, and the second section 72, which is the portion between the first section 71 and the third section 73 and extends toward the printed substrate 20 in the direction DR. Therefore, even when the coefficient of linear expansion of the substrate 4, for example, a customer substrate, differs from the coefficient of linear expansion of the printed substrate 20 of the sensor module 12, the lead group 60 can absorb and reduce the stress induced by the difference in the coefficient of linear expansion. That is, the second section 72 of each of the leads 70 of the lead group 60 is deformed and distorted to reduce the stress induced in the printed substrate 20. Deterioration of the sensor characteristics of the inertial sensor due to the stress resulting from the difference in the coefficient of linear expansion can therefore be suppressed. For example, the mounting reliability of the solder deteriorates by a greater amount as larger stress acts on the solder. However, according to the present embodiment, the stress acting on the solder can be reduced, whereby deterioration of the solder mounting reliability can be suppressed. The inertial measurement unit 10 can therefore be so provided that the sensor module 12 including an inertial sensor can be appropriately mounted with deterioration of the sensor characteristics of the inertial sensor and deterioration of the mounting reliability resulting from the difference in the coefficient of linear expansion suppressed.

The inertial measurement unit 10 further includes, as the lead group 60, the lead group 60A, which is provided in correspondence with the edge SD1 of the printed substrate 20, and the lead group 60B, which is provided in correspondence with the edge SD2 of the printed substrate 20, which is the edge facing the edge SD1. The lead group 60A forms the first lead group, the lead group 60B forms the second lead group, the edge SD1 is the first edge, and the edge SD2 is the second edge. The inertial measurement unit 10 according to the present embodiment thus includes at least the lead group 60A, which is provided in correspondence with the edge SD1 of the printed substrate 20, and the lead group 60B, which is provided in correspondence with the edge SD2 of the printed substrate 20, which is the edge facing the edge SD1. Therefore, the lead group 60A can support the edge SD1 of the printed substrate 20, and the lead group 60B can support the edge SD2 of the printed substrate 20. Even when stress is induced in the direction, for example, from the edge SD1 toward the edge SD2 due to the difference in the coefficient of linear expansion, the second section 72 of each of the leads 70 of the lead groups 60A and 60B provided in correspondence with the edges SD1 and SD2 is deformed and distorted to reduce the stress induced in the printed substrate 20. Deterioration of the sensor characteristics and deterioration of the mounting reliability resulting from the difference in the coefficient of linear expansion can therefore be effectively suppressed.

The inertial measurement unit 10 further includes, as the lead group 60, the lead group 60C, which is provided in correspondence with the edge SD3 of the printed substrate 20, which is the edge that intersects the edges SD1 and SD2, and the lead group 60D, which is provided in correspondence with the edge SD4 of the printed substrate 20, which is the edge facing the edge SD3. The lead group 60C forms the third lead group, the lead group 60D forms the fourth lead group, the edge SD3 is the third edge, and the edge SD4 is the fourth edge. The inertial measurement unit 10 according to the present embodiment thus includes the lead groups 60A, 60B, 60C, and 60D provided in correspondence with the edges SD1, SD2, SD3, and SD4. The lead groups 60A, 60B, 60C, and 60D can thus support the locations of the printed substrate 20 that correspond to the four edges SD1, SD2, SD3, and SD4. Even when stress is induced in the printed substrate 20, for example, in the direction from the edge SD1 toward the edge SD2 or in the direction from the edge SD3 toward the edge SD4 due to the difference in the coefficient of linear expansion, the second section 72 of each of the leads 70 of the lead groups 60A, 60B, 60C, and 60D provided in correspondence with the edges SD1, SD2, SD3, and SD4 is distorted to reduce the stress. Deterioration of the sensor characteristics and deterioration of the mounting reliability due to the stress resulting from the difference in the coefficient of linear expansion can therefore be effectively suppressed. In FIG. 1, the lead groups 60A, 60B, 60C, and 60D are provided at the locations of the printed substrate 20 that correspond to all the edges SD1, SD2, SD3, and SD4, and the lead groups may instead be provided at locations corresponding to at least two of the edges.

A gullwing-type lead can be used as each of the leads 70, as shown in FIG. 5. In this case, the first section 71 of each of the leads 70 extends in the direction away from the printed substrate 20 along the plane direction of the attachment surface 2. The third section 73 of each of the leads 70 is coupled to a second surface of the printed substrate 20 that is the surface opposite a first surface on which the inertial sensor is provided. Specifically, the third section 73 of each of the leads 70 is coupled to the external connection terminal 22 formed on the second surface, which is the bottom surface of the printed substrate 20, for example, by using solder, for example, high-melting-point solder, or by using a brazing material. The external connection terminals 22 are mounting pads and are metal electrodes. Using the leads 70 each formed of a gullwing-type lead allows the second section 72 of each of the gullwing-type leads 70 to be deformed or otherwise changed to reduce the stress resulting from the difference in the coefficient of linear expansion, whereby deterioration of the sensor characteristics and deterioration of the mounting reliability can be suppressed. As a variation, the third section 73 of each of the gullwing-type leads 70 in FIG. 5 can be coupled to the first surface of the printed substrate 20, which is the upper surface thereof, or the side surface of the printed substrate 20. That is, the third section 73 is coupled to the external connection terminal 22 formed on the first surface or the side surface. The third section 73 extends along the plane direction of the surface to which the third section 73 is coupled.

The leads 70 may each be a J-lead-type lead, which is a bent lead having a J-letter-like shape, as shown in FIGS. 6 and 7. In this case, the tip of the first section 71 of each of the leads 70 extends toward the printed substrate 20 in a direction that intersects the attachment surface 2. The third section 73 of each of the J-lead-type leads 70 is coupled to the side surface of the printed substrate 20 in FIG. 6 or coupled to the first surface of the printed substrate 20, which is the upper surface thereof in FIG. 7. That is, the third section 73 of each of the leads 70 is coupled to the external connection terminal 22 formed on the side surface or the first surface of the printed substrate 20. Using the thus configured J-lead-type leads 70 allows the second section 72 of each of the J-lead-type leads 70 to be deformed or otherwise changed to reduce the stress resulting from the difference in the coefficient of linear expansion, whereby deterioration of the sensor characteristics and deterioration of the mounting reliability can be suppressed.

Figure 8:
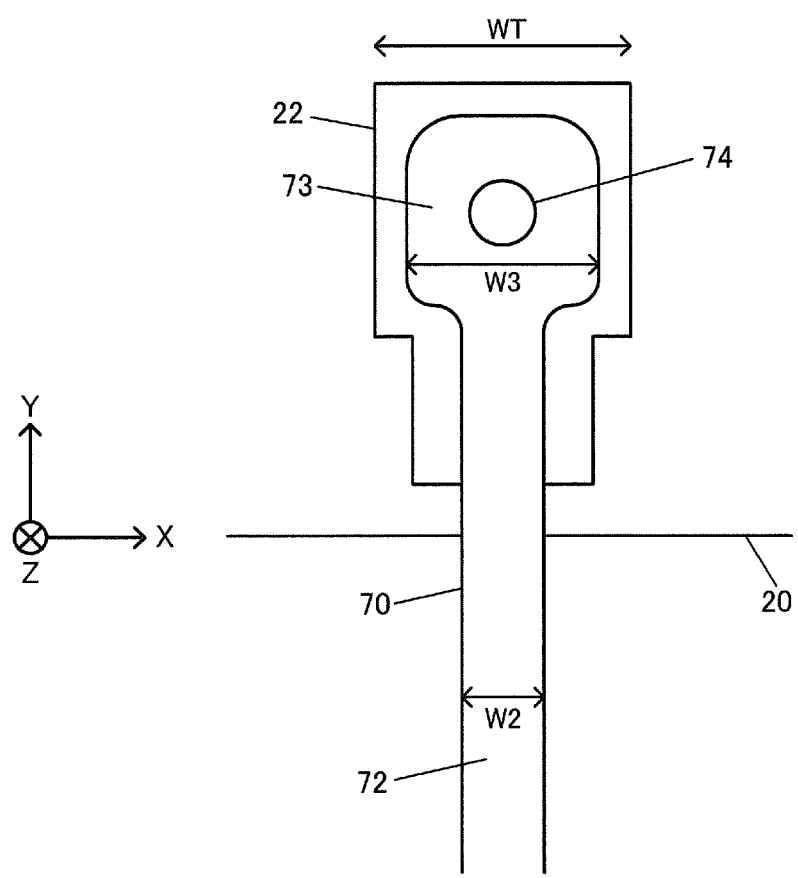
FIG. 8 describes the arrangement of an external connection terminal on a printed substrate and a lead.

The arrangement of each of the external connection terminals 22 on the printed substrate 20 and the corresponding lead 70 will next be described with reference to FIG. 8. FIG. 8 is a plan view viewed along the direction perpendicular to the bottom surface of the printed substrate 20 that is the surface on which the external connection terminals 22 are provided. That is, FIG. 8 is a plan view viewed along the Z-axis direction. In the plan view of FIG. 8, a width WT of the external connection terminal 22 is greater than a width W3 of the third section 73 of the lead 70. The width W3 is a width in a direction perpendicular to the direction in which the lead 70 extends. For example, in the plan view of FIG. 8, the third section 73 of the lead 70 is so coupled to the external connection terminal 22 on the printed substrate 20 that the external connection terminal 22 contains the third section 73. The mounting reliability of the connection between the external connection terminal 22 on the printed substrate 20 and the third section 73 of the lead 70 can thus be improved. For example, when the third section 73 is coupled to the external connection terminal 22 with the solder 24, as shown in FIG. 9, which will be described later, the mounting reliability of the solder can be improved.

A hole 74 is provided in the third section 73 of the lead 70, as shown in FIG. 8. That is, the hole 74, which is a through hole, is formed. Providing the hole 74 can, for example, increase the mounting area over which the third section 73 is coupled to the external connection terminal 22, and the mounting volume of the solder 24 can be increased accordingly, whereby the mounting reliability can be further improved. That is, solder connection is present not only in the portion where the external connection terminal 22 is bonded to the third section 73 but in the hole 74, whereby more robust, reliable coupling is achieved. One hole 74 is provided in FIG. 8, and a plurality of holes may be provided.

The width W3 of the third section 73 of the lead 70 is larger than a width W2 of the second section 72, as shown in FIG. 8. The larger width W3 of the third section 73 allows an increase in the area over which the third section 73 is coupled to the external connection terminal 22 on the printed substrate 20. The mounting volume of the solder 24 at the portion where the third section 73 is bonded to the external connection terminal 22 thus increases, whereby the third section 73 of the lead 70 can be coupled to the external connection terminal 22 with high reliability. Further, the smaller width W2 of the lead 70 allows the lead group 60 to be readily routed.

The corners of the third section 73 of the lead 70 are so rounded, as shown in FIG. 8, as not to cause stress concentration. That is, the sharp corners are chamfered into rounded corners. As a result, the solder 24 is unlikely to crack even when stress acts on the solder 24, whereby the mounting reliability can be further improved.

Figure 10:
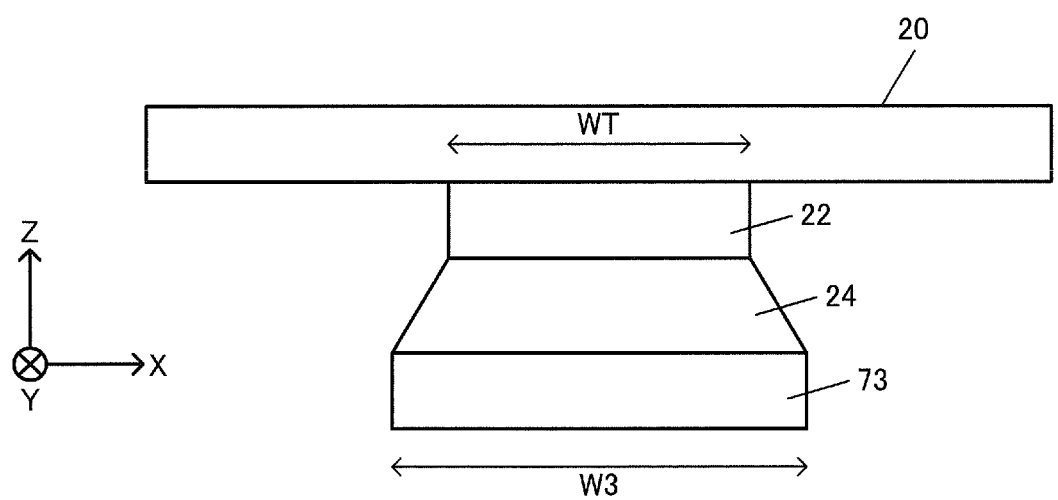
FIG. 10 describes another method for coupling the external connection terminal to the lead by using solder.

In the present embodiment, the third section 73 of the lead 70 is coupled to the external connection terminal 22 on the printed substrate 20 with the solder 24. For example, FIG. 9 is a side view of the portion where the third section 73 of the lead 70 is bonded to the external connection terminal 22. That is, FIG. 9 is a side view viewed along the Y-axis direction. The third section 73 of the lead 70 is coupled to the external connection terminal 22 on the printed substrate 20 with the solder 24, as shown in FIG. 9. In FIG. 9, the width WT of the external connection terminal 22 is larger than the width W3 of the third section 73. The solder 24 at the portion where the third section 73 is bonded to the external connection terminal 22 therefore has a fillet-like shape, whereby the mounting reliability of the solder can be improved. As a variation, the width WT of the external connection terminal 22 can be smaller than the width W3 of the third section 73, as shown in FIG. 10. The mounting method described above also allows fillet-shaped solder 24, whereby the mounting reliability of the solder can be improved. The method in FIG. 10 prevents the fillet-shaped solder 24 from extending off the outer shape of the printed substrate 20, minimizing the formed lead group 60, whereby the product size of the inertial measurement unit 10 can be reduced.

In the present embodiment, since the external connection terminals 22 on the printed substrate 20 are fixed to the third sections 73 of the leads 70 with the solder 24, the reliability of the coupling at the portions where the third sections 73 are bonded to the external connection terminals 22 can be ensured. For example, the third sections 73 can be more securely coupled to the external connection terminals 22 with the solder 24 with higher reliability, whereby proper signal transmission between the sensor module 12 and an external component via the external connection terminals 22 and the leads 70 can be achieved.

The first sections 71 of the leads 70 are coupled to connection terminals on the substrate 4, such as a customer substrate, by using solder. In this process, the solder coupling is performed by using reflowing in many cases. The first sections 71 of the leads 70 are coupled to the connection terminals on the substrate 4, for example, by printing solder paste onto lands that are the connection terminals on the substrate 4, mounting the sensor module 12 on the substrate 4, and melting the solder by using the heat generated by the reflowing. In this case, the heat generated by the reflowing could undesirably also melt the solder 24 that couples the third sections 73 of the leads 70 to the external connection terminals 22 on the printed substrate 20.

To avoid the problem described above, the third sections 73 of the leads 70 are coupled to the external connection terminals 22 with the high-melting-point solder 24 in the present embodiment. For example, the third sections 73 are coupled to the external connection terminals 22 with solder 24 having a melting point higher than 220 degrees. As a result, even when the first sections 71 of the leads 70 are coupled by reflowing to the connection terminals on the substrate 4 with solder, the situation in which the heat generated by the reflowing melts the solder 24 at the portions where the third sections 73 are bonded to the external connection terminals 22 can be avoided. A problem with the connection between the lead group 60 and the sensor module 12 can therefore be avoided when the inertial measurement unit 10 is assembled onto a customer substrate.

Figures 11, 12:
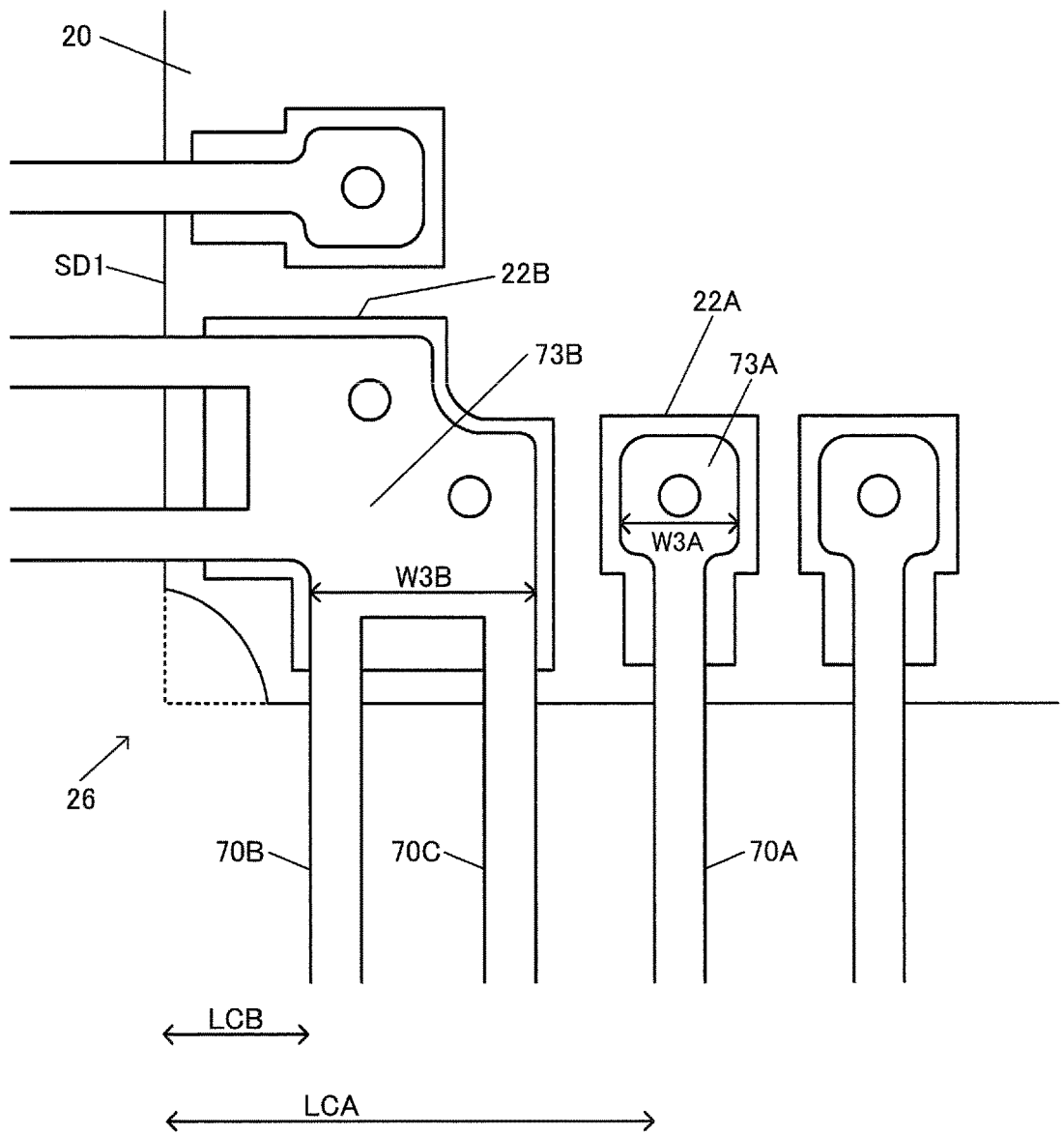
FIG. 11 describes a method using high-melting-point solder or brazing material.
FIG. 12 describes a detailed example of the coupling between the external connection terminals on the printed substrate and the leads.

FIG. 11 shows an example of the high-melting-point solder. The high-melting-point solder having the melting point higher than 220 degrees is, for example, Sn—Sb-based solder, which is an alloy of tin and antimony, as shown in FIG. 11. Sn—Sb-based solder can achieve high-melting-point solder having a melting point of 240° C. or higher or 245° C. or higher, which is solder having a melting point higher than that of typical solder, for example, Sn—Pb-based solder, which is an alloy of tin and lead. Therefore, even when the first sections 71 of the leads 70 are coupled to the connection terminals on the substrate 4 with Sn—Pb-based solder by using reflowing, coupling the third sections 73 of the leads 70 to the external connection terminals 22, for example, with Sn—Sb-based high-melting-point solder 24 can avoid the problem with the coupling between the lead group 60 and the sensor module 12 from occurring when the inertial measurement unit 10 is assembled onto a customer substrate.

The high-melting-point solder having the melting point higher than 220 degrees is not limited to Sn—Pb-based solder and can be any of a variety of other types of solder, such as Sn—Ag-based solder, which is an alloy of tin and silver, and Sn—Cu-based solder, which is an alloy of tin and copper.

The third sections 73 of the leads 70 may be coupled to the external connection terminals 22 on the printed substrate 20 with a brazing material. According to brazing using a brazing material, the brazing material, which is an alloy having a melting point lower than that of a base material that is a member to be bonded, can be melted to bond a plurality of members to each other without the base material itself melted. Examples of the brazing material may include gold, silver, and copper brazing materials, and the melting points thereof are higher than or equal to 800° C. or higher than or equal to 600° C., as shown in FIG. 11. Therefore, even when the first sections 71 of the leads 70 are coupled by reflowing to the connection terminals on the substrate 4 with solder, coupling the third sections 73 of the leads 70 to the external connection terminals 22 with a brazing material can avoid the problem with the coupling between the lead group 60 and the sensor module 12 from occurring when the inertial measurement unit 10 is assembled onto a customer substrate.

FIG. 12 shows a detailed example of the coupling between the external connection terminals 22 on the printed substrate 20 and the leads 70. For example, the lead group 60 in the present embodiment includes a lead 70A and a lead 70B. The lead 70A is a first lead, and the lead 70B is a second lead. A third section 73A of the lead 70A is coupled to an external connection terminal 22A on the printed substrate 20, and a third section 73B of the lead 70B is coupled to an external connection terminal 22B on the printed substrate 20. A width W3B of the third section 73B of the lead 70B, which is the second lead, is greater than a width W3A of the third section 73A of the lead 70A, which is the first lead, as shown in FIG. 12.

For example, in FIG. 12, the lead 70B is coupled to a location close to the edge SD1, which forms the outer shape of the printed substrate 20. Large stress therefore acts on the portion where the third section 73B of the lead 70B is bonded to the external connection terminal 22B as compared with the stress acting on the portion where the third section 73A of the lead 70A is bonded to the external connection terminal 22A, so that the solder is likely to crack or otherwise break. To avoid the problem described above, in FIG. 21, the third section 73B of the lead 70B has a larger width W3B and is therefore coupled to the external connection terminal 22 over a greater mounting area. Increasing the mounting area as described above increases the solder mounting volume to allow improvement in the mounting reliability at the portion where the third section 73B of the lead 70B is bonded to the external connection terminal 22B.

In FIG. 12, the lead group 60 further includes a lead 70C. The lead 70C is a third lead. The lead 70C adjacent to the lead 70B and having the same potential as that at the lead 70B is coupled to the third section 73B of the lead 70B. That is, the third section 73B is shared by the two leads 70B and 70C and set at the same potential, for example, GND. The third section 73B shared by the two leads 70B and 70C can therefore be used to couple the leads 70B and 70C to the external connection terminal 22B on the printed substrate 20, for example, with the solder 24. The mounting area is therefore increased, and the solder mounting volume increases accordingly, whereby the mounting reliability at the portion where the third section 73B is bonded to the external connection terminal 22B can be improved.

In FIG. 12, a distance LCB from a corner 26 of the printed substrate 20 to the lead 70B is smaller than a distance LCA from the corner 26 of the printed substrate 20 to the lead 70A. For example, it is believed that the difference in the coefficient of linear expansion causes large stress to be induced at the corner 26 of the printed substrate 20 as compared with the stress induced at the other locations in the printed substrate 20. The reason for this is that stress in the direction from the edge SD1 to the edge SD2 of the printed substrate 20 and stress in the direction from the edge SD3 to the edge SD4 of the printed substrate 20, for example, are both induced at the corner 26. In the configuration in which the lead group 60 supports the sensor module 12, as in the present embodiment, the stress can be reduced, but the mounting reliability could undesirably decrease due to residual stress. In this regard, the third section 73B of the lead 70B, the distance LCB from which to the corner 26 is small, has the large width W3B, and the area over which the third section 73B is mounted on the external connection terminal 22B increases accordingly in FIG. 12. The width W3B of the third section 73B is therefore increased, and the solder mounting volume increases accordingly, whereby the mounting reliability at the portion where the third section 73B is bonded to the external connection terminal 22B can be improved, and breakage of the bonded portion due, for example, to cracking of the solder can be avoided even when large stress acts on the third section 73B, which is located in the vicinity of the corner 26 of the printed substrate 20.

Further, in the present embodiment, the height H of the lead group 60 in the side view of the printed substrate 20 is desirably at least 1.7 mm, as shown in FIG. 5. The height H is smaller than the overall length of each of the leads 70. That is, the height H is smaller than the overall length of each of the straightened gullwing-type leads 70 shown in FIG. 5.

Figure 13:
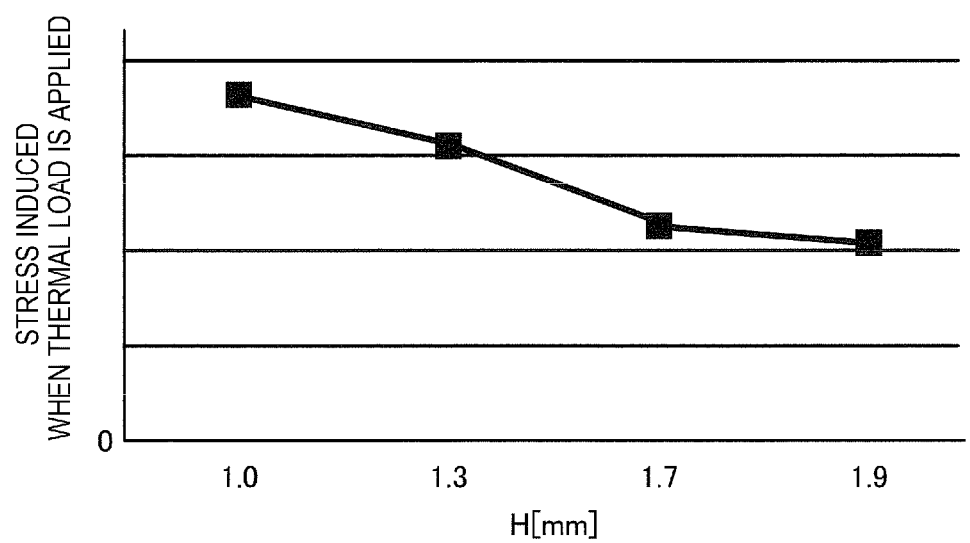
FIG. 13 shows the relationship between the height of the printed substrate and stress induced therein.

FIG. 13 shows the result of a simulation showing the relationship between the height H of the lead group 60 and the stress induced when thermal load is applied, and FIG. 13 shows how the stress at a mounted portion depends on the height. The greater the height H of the lead group 60, the smaller the stress acting on the mounted portion, as shown in FIG. 13. Therefore, to reduce the stress, it is desirable to maximize the height H of the lead group 60. The decrease in the stress resulting from the increase in the height H reaches a plateau when the height H is, for example, greater than or equal to 1.7 mm, as shown in FIG. 13. Setting the height H of the lead group 60 in such a way that H≥1.7 mm is satisfied therefore allows the stress to be set at the value in the plateau. The stress acting on the portion where the solder 24 is mounted can thus be reduced to an optimum value, whereby the occurrence of solder cracks and other undesirably phenomena resulting from the stress induced by the difference in the coefficient of linear expansion can be effectively suppressed. Too large a height H prevents reduction in the size of the inertial measurement unit 10. The height of the lead group 60, which supports the sensor module 12 of the inertial measurement unit 10, is therefore set at a value at least smaller than the overall length of each of the leads 70. The mounting reliability can thus be improved with the size of the inertial measurement unit 10 reduced.

In the present embodiment, a length L3 of the third section 73 in the direction in which the leads 70 extend is greater than a length L1 of the first section 71, as shown in FIG. 5. That is, the relationship L3>L1 is satisfied. The length in the direction in which the leads 70 extend is the length in the direction perpendicular to the directions of the widths W2 and W3 in FIG. 8. The longer length L3 of the third section 73 of each of the leads 70 as described above increases the mounting area of the portion where the third section 73 is bonded to the corresponding external connection terminal 22, whereby the mounting reliability can be improved. For example, since the volume of the mounted solder at the portion where the third section 73 is bonded to the corresponding external connection terminal 22 increases, whereby the third section 73 can be bonded to the corresponding external connection terminal 22 with higher reliability. On the other hand, the short length L1 of the first section 71 of each of the leads 70 allows compact mounting of the lead 70, for example, on the customer substrate 4 with over a smaller mounting area.

Figure 14:
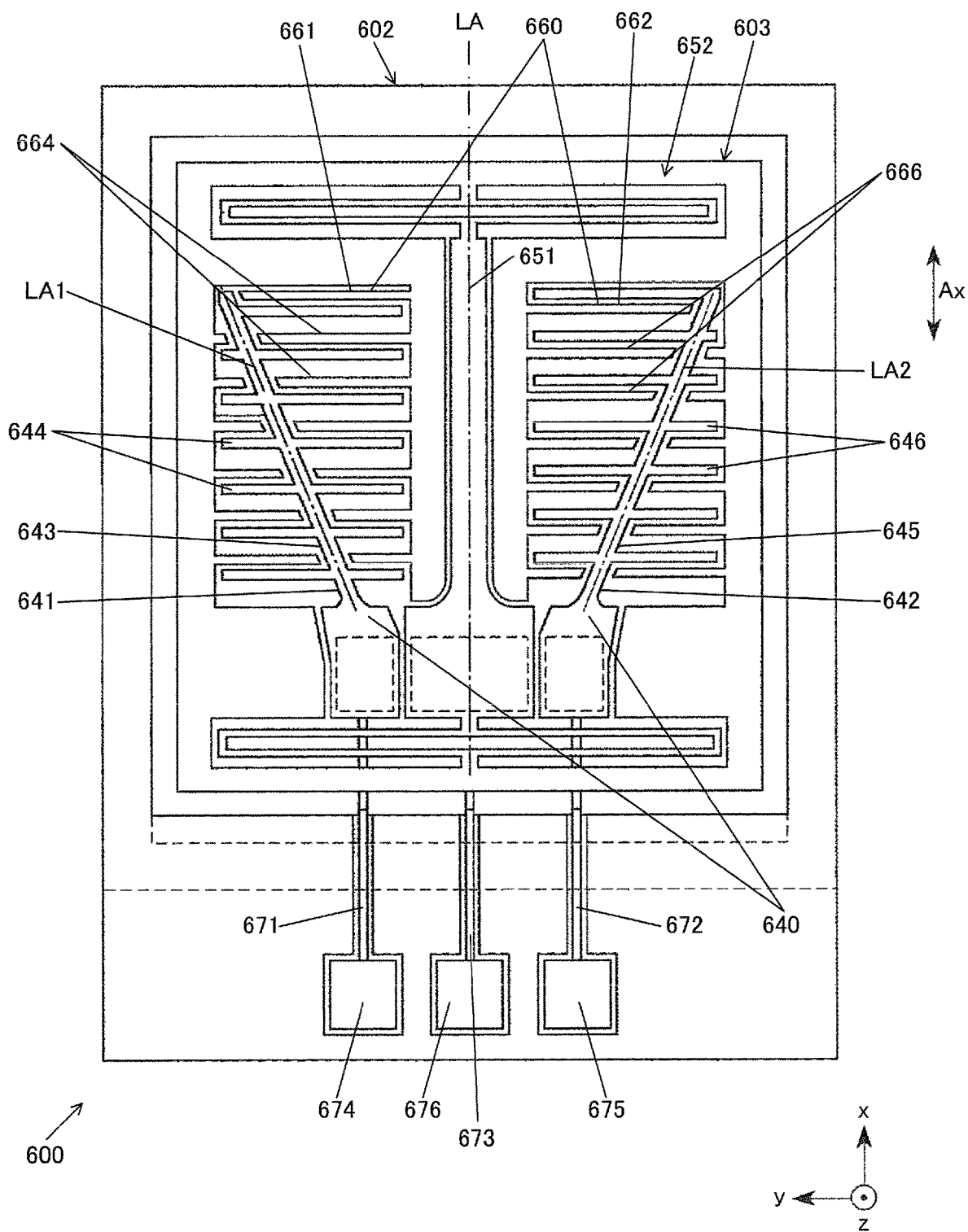
FIG. 14 is a plan view showing an example of the configuration of an acceleration sensor device for axes X and Y.
Figure 15:
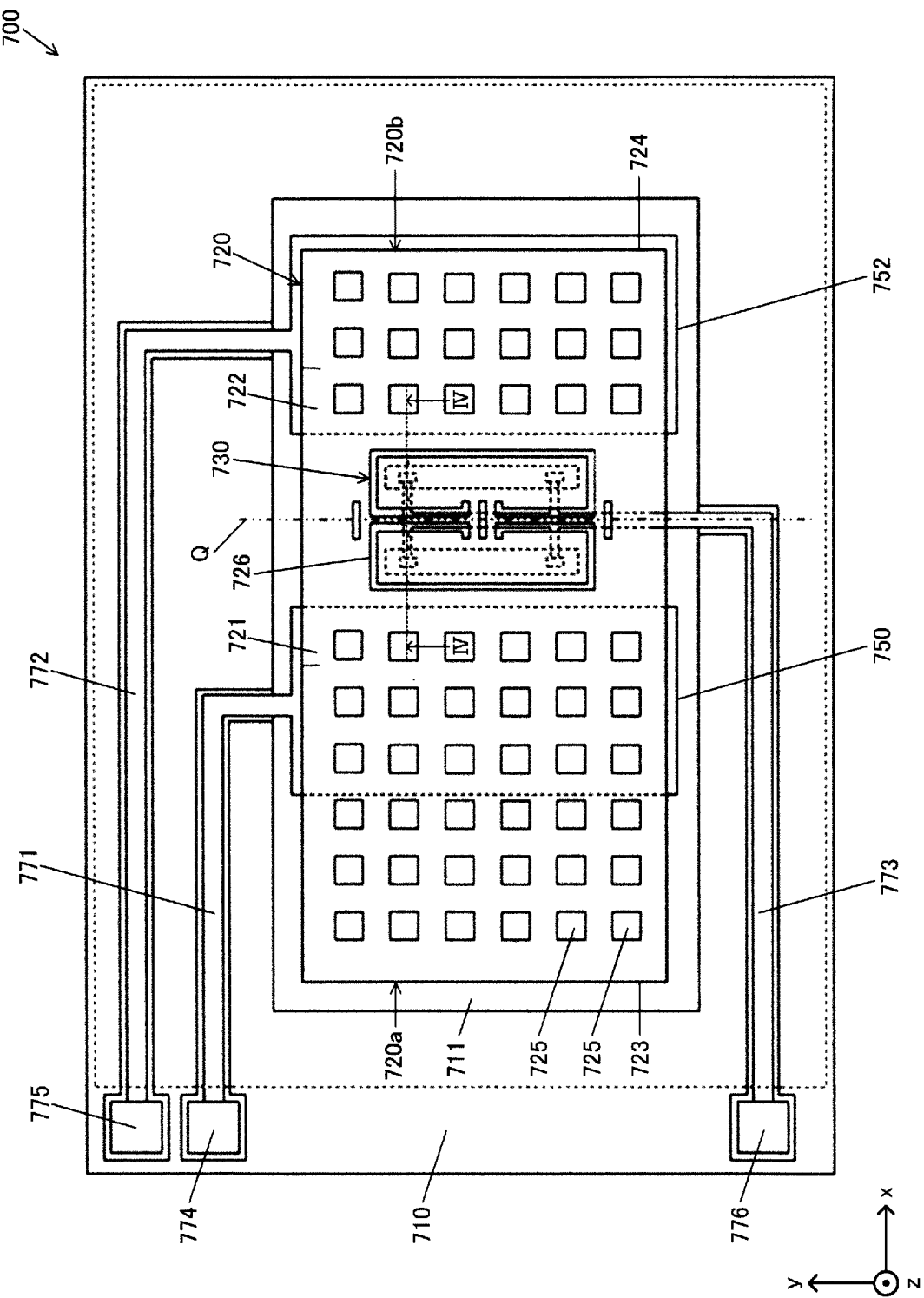
FIG. 15 is a plan view showing an example of the configuration of an acceleration sensor device for a Z axis.
Figure 16:
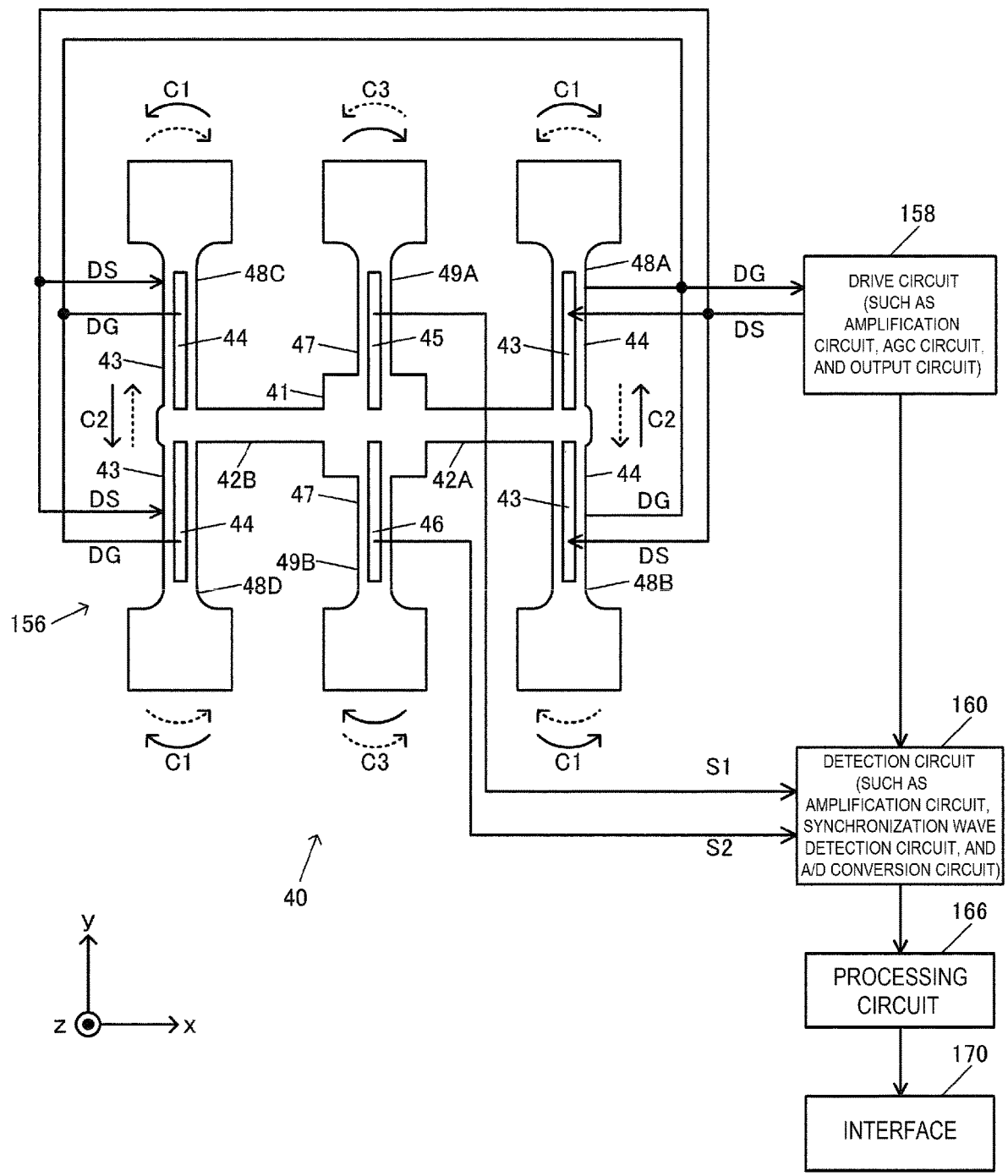
FIG. 16 is a plan view showing an example of the configuration of a gyro sensor.

The printed substrate 20 is a ceramic substrate, and the inertial sensor is an inertial sensor accommodated in a ceramic package, as described above. For example, a ceramic substrate, such as a glass ceramic substrate and an alumina ceramic substrate, is used as the printed substrate 20. The inertial sensor, such as the acceleration sensor 30 and the gyro sensors 40X, 40Y, and 40Z in FIG. 3, is an inertial sensor accommodated in a ceramic package. That is, an inertial sensor device that is an acceleration sensor device or a gyro sensor device that will be described with reference to FIGS. 14, 15, and 16 is accommodated in a ceramic package. As an example, the ceramic package includes a container and a lid made of ceramic, and an inertial sensor device is accommodated in an accommodation space formed by the container and the lid hermetically bonded to each other. For example, the bottom surface or the side surface of the ceramic container is then attached to the printed substrate 20. The inertial sensor is thus mounted on the printed substrate 20. When the package of the inertial sensor is made of a ceramic material, as described above, using a ceramic substrate as the printed substrate 20 allows the difference in the coefficient of linear expansion between the package of the inertial sensor and the printed substrate 20 to be reduced to a sufficiently small value. Deterioration of the detection characteristics of the inertial sensor and a decrease in the reliability of mounting the inertial sensor on the printed substrate 20 due to the stress resulting from the difference in the coefficient of linear expansion can therefore be suppressed.

In the present embodiment, the printed substrate 20 maybe a resin substrate, the inertial sensor may be an inertial sensor accommodated in a ceramic package, and the difference in the coefficient of linear expansion between the resin substrate and the ceramic package may be smaller than or equal to 30%. The difference in the coefficient of linear expansion between the package of the inertial sensor and the printed substrate 20 can thus be sufficiently small. Deterioration of the detection characteristics of the inertial sensor and a decrease in the reliability of mounting the inertial sensor on the printed substrate 20 due to the stress resulting from the difference in the coefficient of linear expansion can therefore be suppressed.

2. Acceleration Sensor and Gyro Sensor

FIG. 14 shows an example of the configuration of an acceleration sensor device 600. The acceleration sensor device 600 is provided in the acceleration sensor 30 and used to detect acceleration in the X-axis or Y-axis direction in FIGS. 1 to 3.

In FIG. 14, the acceleration sensor device 600 can detect acceleration Ax in an x-axis direction, which is the direction of the detection axis of the acceleration sensor device 600. The acceleration sensor device 600 includes abase section 602 and a device section 603, which is provided on the base section 602 and detects the acceleration Ax. The device section 603 includes fixed electrode sections 640, which are attached to the base section 602, a movable section 652, which is displaceable in the x-axis direction, which is the direction of the detection axis of the acceleration sensor device 600, and movable electrode sections 660, which are provided in the movable section 652. The fixed electrode sections 640 include a first fixed electrode section 641 and a second fixed electrode section 642, which are arranged side by side along a y-axis direction. The first fixed electrode section 641 includes a first stem section 643 and a plurality of fixed electrode fingers 644, which are provided on opposite sides of the first stem section 643 in the y-axis direction and each have a longitudinal direction extending along the y-axis direction. The second fixed electrode section 642 includes a second stem section 645 and a plurality of fixed electrode fingers 646, which are provided on opposite sides of the second stem section 645 in the y-axis direction and each have a longitudinal direction extending along the y-axis direction. The movable electrode sections 660 include a first movable electrode section 661 and a second movable electrode section 662, which are arranged side by side along the y-axis direction. At least part of the first movable electrode section 661 includes a plurality of first movable electrode fingers 664, which are provided on opposite sides of the first stem section 643 in the y-axis direction, each have a longitudinal direction extending along the y-axis direction, and face the first fixed electrode fingers 644 in the x-axis direction. At least part of the second movable electrode section 662 includes a plurality of second movable electrode fingers 666, which are provided on opposite sides of the second stem section 645 in the y-axis direction, each have a longitudinal direction extending along the y-axis direction, and face the second fixed electrode fingers 646 in the x-axis direction. The configuration described above allows the capacitance between the first movable electrode fingers 664 and the first fixed electrode fingers 644 and the capacitance between the second movable electrode fingers 666 and the second fixed electrode fingers 646 to be maintained sufficiently large and the lengths of the first and second fixed electrode fingers 644, 646 and the first and second movable electrode fingers 664, 666 to be short. The first and second fixed electrode fingers 644, 646 and the first and second movable electrode fingers 664, 666 are therefore unlikely to be broken, whereby the acceleration sensor device 600 has excellent impact resistance.

The acceleration sensor device 600 has a structure linearly symmetric with respect to a line LA. The direction of the first stem section 643 extends along the direction of a line LA1, and the direction of the second stem section 645 extends along the direction of a line LA2. The first fixed electrode section 641 and the second fixed electrode section 642 are electrically coupled to pads 674 and 675 via wiring lines 671 and 672, respectively. The movable electrode sections 660 are electrically coupled to a pad 676 via a movable section support section 651 and a wiring line 673.

In the acceleration sensor 300, the acceleration sensor device 600 in FIG. 14 is so disposed as a sensor device for X-axis acceleration detection that the x-axis direction coincides with the X-axis direction. Similarly, in the acceleration sensor 300, the acceleration sensor device 600 in FIG. 14 is so disposed as a sensor device for Y-axis acceleration detection that the x-axis direction coincides with the Y-axis direction. The sensor device for X-axis acceleration detection and the sensor device for Y-axis acceleration detection are accommodated in the package of the acceleration sensor 30.

FIG. 15 shows an example of the configuration of an acceleration sensor device 700 for Z-axis acceleration detection. The acceleration sensor device 700 is provided in the acceleration sensor 30 and used to detect acceleration in the Z-axis direction in FIGS. 1 to 3. The acceleration sensor device 700 for Z-axis direction acceleration detection is accommodated along with the sensor device for X-axis acceleration detection and the sensor device for Y-axis acceleration detection described in FIG. 14 in the package.

In FIG. 15, the acceleration sensor device 700 can detect acceleration in the direction of the z-axis, which is the detection axis of the acceleration sensor device 700. The acceleration sensor device 700 includes a movable section 720 supported by a support section 730. The movable section 720 includes a first movable section 720a, which is located on the negative side of the x-axis direction, which is one side of a support axis Q in the plan view, and a second movable section 720b, which is located on the positive side of the x-axis direction, which is the other side of the support axis Q in the plan view. In the acceleration sensor device 700, in which the support axis Q is located in a position shifted from the center of gravity of the movable section 720, the first movable section 720a and the second movable section 720b have masses different from each other. In the example shown in FIG. 15, the distance from the support axis Q to an end surface 723 of the first movable section 720a is greater than the distance from the support axis Q to an end surface 724 of the second movable section 720b. The thickness of the first movable section 720a is equal to the thickness of the second movable section 720b. The mass of the first movable section 720a is therefore greater than the mass of the second movable section 720b. As described above, the configuration in which the first movable section 720a and the second movable section 720b have masses different from each other allows the rotational moment of the first movable section 720a and the rotational moment of the second movable section 720b not to be in balance when vertical acceleration acts on the acceleration sensor device 700. The movable section 720 is therefore allowed to incline by a predetermined value when vertical acceleration acts on the acceleration sensor device 700.

The movable section 720 is so provided as to separate from a substrate 710. The movable section 720 is provided above a recess 711. A gap is provided between the movable section 720 and the substrate 710. The movable section 720 is thus allowed to swing. The movable section 720 includes a first movable electrode 721 and a second movable electrode 722 provided on opposite sides of the support axis Q. The first movable electrode 721 is provided at the first movable section 720a, and the second movable electrode 722 is provided at the second movable section 720b. The first movable electrode 721 is a portion of the movable section 720 that is the portion that coincides with a first fixed electrode 750 in the plan view. The first movable electrode 721 and the first fixed electrode 750 form capacitance CB1 therebetween. The second movable electrode 722 is a portion of the movable section 720 that is the portion that coincides with a second fixed electrode 752 in the plan view. The second movable electrode 722 and the second fixed electrode 752 form capacitance CB2 therebetween. In the acceleration sensor device 700, the movable section 720 is made of an electrically conductive material, such as silicon to which an impurity has been doped, so that the first movable electrode 721 and the second movable electrode 722 are provided. That is, the first movable section 720a functions as the first movable electrode 721, and the second movable section 720b functions as the second movable electrode 722.

The capacitance CB1 and the capacitance CB2 are configured to be equal to each other, for example, with the movable section 720 taking a horizontal attitude. The positions of the first movable electrode 721 and the second movable electrode 722 change in accordance with the motion of the movable section 720, and the capacitance CB1 and the capacitance CB change accordingly. Predetermined potential is imparted to the movable section 720 via the support section 730. Through holes 725, which pass through the movable section 720, are formed in the movable section 720. The effect of the air on the movable section 720 can therefore be reduced when the movable section 720 swings. An opening 726, which passes through the movable section 720, is formed in the movable section 720. The support section 730 is provided on the substrate 710. The support section 730 is located in the opening 726 and supports the movable section 720. The first fixed electrode 750 and the second fixed electrode 752 are electrically coupled to pads 774 and 775 via wiring lines 771 and 772. The movable section 720 is electrically coupled to a pad 776 via a wiring line 773.

FIG. 16 shows an example of the detailed configuration of a gyro sensor 40, which is any of the gyro sensors 40X, 40Y, and 40Z in FIGS. 1 to 3. The gyro sensor 40 in FIG. 16 detects angular velocity around the axis z. The gyro sensors 40X, 40Y, and 40Z in FIGS. 1 to 3 are each so disposed that the direction of the axis z, which is the detection axis of the gyro sensor, coincides with the corresponding one of the axes X, Y, and Z.

The gyro sensor 40 includes a vibrator 156, a drive circuit 158, a detection circuit 160, a processing circuit 166, and an interface 170, and the vibrator 156, which is a gyro sensor device, and an integrated circuit apparatus (IC) that achieves the circuits described above are accommodated in the package. The drive circuit 158 can include an amplification circuit to which a feedback signal DG is inputted from the vibrator 156 and which amplifies the signal, an AGC circuit that performs automatic gain control, an output circuit that outputs a drive signal DS to the vibrator 156, and other circuits. The detection circuit 160 can include an amplification circuit, a synchronization wave detection circuit, an A/D conversion circuit, and other circuits. The amplification circuit receives detection signals S1 and S2 as an input from the vibrator 156 and performs electric charge-voltage conversion and signal amplification on the detection signals S1 and S2, which are differential signals. The synchronization wave detection circuit uses a sync signal from the drive circuit 158 to perform synchronization wave detection for extracting a desired wave. The A/D conversion circuit converts an analog detection signal after the synchronization wave detection into digital detection data and outputs the detection data to the processing circuit 166. The processing circuit 166 performs a variety of types of processing on the detection data, such as zero point correction, sensitivity adjustment, filtering, and temperature correction and outputs processed detection data to the interface 170.

In FIG. 16, a vibrator having a double-T structure is used as the vibrator 156. A tuning-fork-shaped or H-shaped vibrator may be used as the vibrator 156. The vibrator 156 includes drive arms 48A, 48B, 48C, and 48D, detection arms 49A and 49B, abase 41, and linkage arms 42A and 42B. The detection arms 49A and 49B extend from the base 41, which has a rectangular shape, in the +y-axis direction and the −y-axis direction, respectively. The linkage arms 42A and 42B extend from the base 41 in the +x-axis direction and the −x-axis direction, respectively. The drive arms 48A and 48B extend from a tip portion of the linkage arm 42A in the +y-axis direction and the −y-axis direction, respectively, and the drive arms 48C and 48D extend from a tip portion of the linkage arm 42B in the +y-axis direction and the −y-axis direction, respectively. A weight for frequency adjustment is provided at the tip of each of the drive arms 48A, 48B, 48C, and 48D and the detection arms 49A and 49B. The vibrator 156 detects angular velocity around the axis z, which is the thickness direction of the vibrator 156.

Drive electrodes 43 are formed on the upper and lower surfaces of each of the drive arms 48A and 48B, and drive electrodes 44 are formed on the right and left side surfaces of each of the drive arms 48A and 48B. The drive electrodes 44 are also formed on the upper and lower surfaces of each of the drive arms 48C and 48D, and the drive electrodes 43 are also formed on the right and left side surfaces of each of the drive arms 48C and 48D. The drive signal DS from the drive circuit 158 is supplied to the drive electrodes 43, and the feedback signal DG from each of the drive electrodes 44 is inputted to the drive circuit 158. Detection electrodes 45 are formed on the upper and lower surfaces of the detection arm 49A, and ground electrodes 47 are formed on the right and left side surfaces of the detection arm 49A. Detection electrodes 46 are formed on the upper and lower surfaces of the detection arm 49B, and the ground electrodes 47 are also formed on the right and left side surfaces of the detection arm 49B. The detection signals S1 and S2 from the detection electrodes 45 and 46 are then inputted to the detection circuit 160.

The action of the gyro sensor 40 will next be described. When the drive circuit 158 applies the drive signal DS to the drive electrodes 43, the inverse piezoelectric effect causes the drive arms 48A, 48B, 48C, and 48D to undergo bending vibration, as indicated by the arrows C1 in FIG. 16. For example, the vibration form indicated by the solid-line arrows and the vibration form indicated by the dotted-line arrows are repeated at a predetermined frequency. That is, the tips of the drive arms 48A and 48C undergo bending vibration that causes the tips to repeatedly approach each other and separate from each other, so do the drive arms 48B and 48D. At this point, since the drive arms 48A, 48B and the drive arms 48C, 48D perform linearly symmetric vibration with respect to the axis x, which passes through the center of gravity of the base 41, the base 41, the linkage arms 42A and 42B, and the detection arms 49A and 49B hardly vibrate.

In this state, when angular velocity around the axis z as the axis of rotation acts on the vibrator 156, Coriolis force causes the drive arms 48A, 48B, 48C, and 48D to vibrate, as indicated by the arrows C2. That is, the Coriolis force in the directions indicated by the arrows C2, which are perpendicular to the directions indicated by the arrows C1 and the direction of the axis z, acts on the drive arms 48A, 48B, 48C, and 48D to produce vibration components in the directions indicated by the arrows C2. The vibration indicated by the arrows C2 is transmitted to the base 41 via the linkage arms 42A and 42B to cause the detection arms 49A and 49B to undergo bending vibration in the directions indicated by the arrows C3. Electric charge signals produced by the piezoelectric effect resulting from the bending vibration of the detection arms 49A and 49B are inputted as the detection signals S1 and S2 to the detection circuit 160, whereby the angular velocity around the axis z is detected.

3. Electronic Instrument and Moving Object

Figure 17:
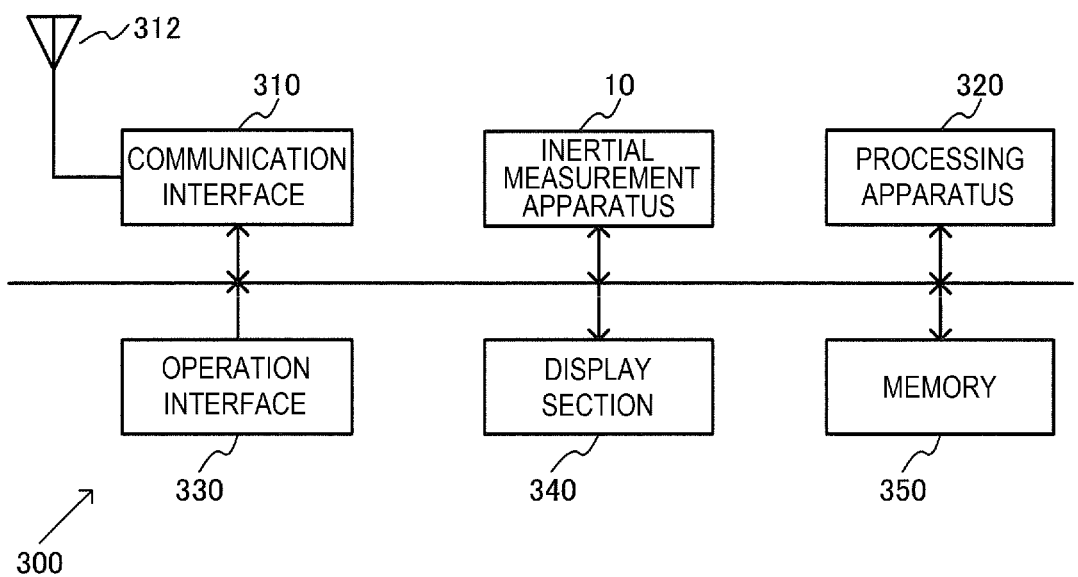
FIG. 17 shows an example of the configuration of an electronic instrument according to the embodiment.

FIG. 17 is a block diagram showing an example of the configuration of an electronic instrument 300 according to the present embodiment. The electronic instrument 300 includes the inertial measurement unit 10 according to the present embodiment and a processing apparatus 320, which carries out processes based on the result of the measurement performed by the inertial measurement unit 10. The electronic instrument 300 can further include a communication interface 310, an operation interface 330, a display section 340, a memory 350, and an antenna 312.

The communication interface 310 is, for example, a wireless circuit and receives data from an external component and transmits data to the external component via the antenna 312. The processing apparatus 320 controls the electric instrument 300 and performs a variety of types of digital processing on the data transmitted and received via the communication interface 310. The processing apparatus 320 performs the variety of types of processing based on the result of the measurement performed by the inertial measurement unit 10. Specifically, the processing apparatus 320 performs signal processing, such as correction and filtering of an output signal that is the result of the measurement performed by the inertial measurement unit 10 or performs a variety of types of control on the electronic instrument 300 based on the output signal. The functions of the processing apparatus 320 can be achieved by a processor, for example, an MPU and a CPU. The operation interface 330 allows a user to perform input operation and can be achieved, for example, by operation buttons or a touch panel display. The display section 340 displays a variety of pieces of information and can be achieved, for example, by a display using a liquid crystal or organic EL material. The memory 350 stores data, and the functions of the memory 350 can be achieved, for example, by a semiconductor memory, such as a RAM and a ROM.

The electronic instrument 300 according to the present embodiment can be used as a variety of instruments, for example, an in-vehicle instrument, a video-related instrument, such as a digital still camera and a video camcorder, a wearable instrument, such as a head mounted display and a timepiece-related instrument, an inkjet-type discharge apparatus, a robot, a personal computer, a mobile information terminal, a printing apparatus, a projection apparatus, a medical instrument, and a measurement instrument. The in-vehicle instrument is, for example, a car navigator and an automatic driving instrument. The timepiece-related instrument is, for example, a timepiece and a smartwatch. The inkjet discharge apparatus is, for example, an inkjet printer. The mobile information terminal is, for example, a smartphone, a mobile phone, a mobile game console, a laptop PC, or a tablet terminal.

Figure 18:
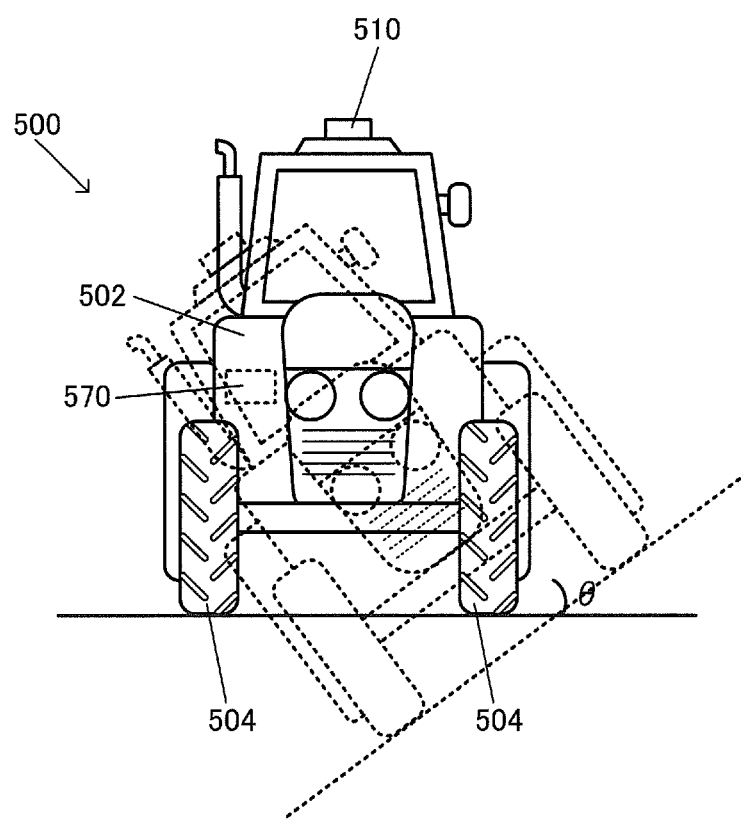
FIG. 18 shows an example of a moving object according to the embodiment.
Figure 19:
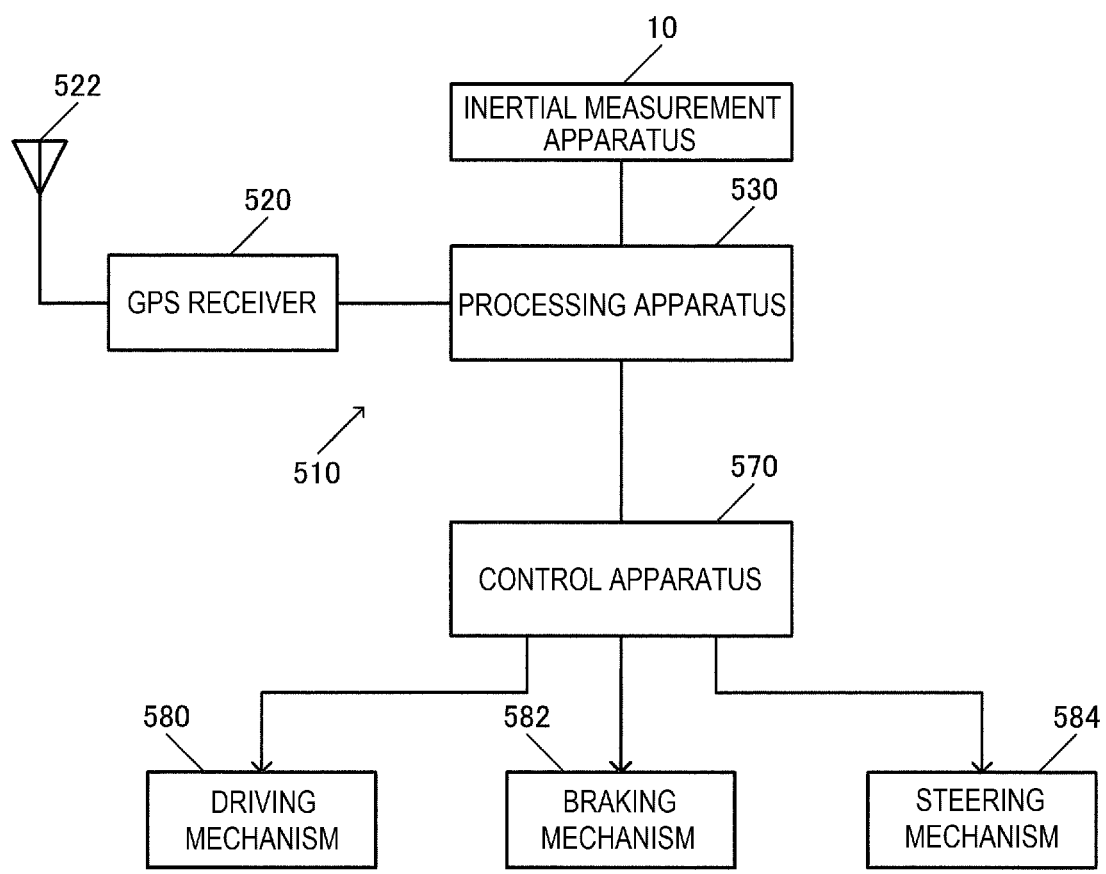
FIG. 19 is a block diagram showing an example of the configuration of the moving object.

FIG. 18 shows an example of a moving object 500 using the inertial measurement unit 10 according to the present embodiment. FIG. 19 is a block diagram showing an example of the configuration of the moving object 500. The moving object 500 includes the inertial measurement unit 10 and a processing apparatus 530, which carries out processes based on the result of the measurement performed by the inertial measurement unit 10.

Specifically, the moving object 500 includes a vehicle body 502 and wheels 504, as shown in FIG. 18. The moving object 500 is equipped with a positioning apparatus 510. A control apparatus 570, which performs vehicle control and other types of control, is provided in the moving object 500. The moving object 500 further includes a driving mechanism 580, such as an engine and a motor, a braking mechanism 582, such as a disk brake and a drum brake, and a steering mechanism 584, which is achieved, for example, by a steering wheel and a steering gear box, as shown in FIG. 19. As described above, the moving object 500 is any of instruments and apparatuses that include the driving mechanism 580, the braking mechanism 582, and the steering mechanism 584 and travel on the ground, in the sky, or on the sea. The moving object 500 is, for example, an automobile, such as a four-wheeled automobile and a motorcycle, a bicycle, a train, an airplane, or a ship and will be described as a four-wheeled automobile by way of example in the present embodiment.

The positioning apparatus 510 is an apparatus that is accommodated in the moving object 500 and measures the position of the moving object 500. The positioning apparatus 510 includes the inertial measurement unit 10 and the processing apparatus 530. The positioning apparatus 510 can further include a GPS receiver 520 and an antenna 522. The processing apparatus 530, which is a host device, receives acceleration data and angular velocity data, which are the result of the measurement performed by the inertial measurement unit 10, performs inertial navigation operation on the data, and outputs inertial navigation positioning data. The inertial navigation positioning data is data representing the acceleration and attitude of the moving object 500.

The GPS receiver 520 receives signals from GPS satellites via the antenna 522. The processing apparatus 530 determines GPS positioning data representing the position, speed, and orientation of the moving object 500 based on the signals received by the GPS receiver 520. The processing apparatus 530 then calculates the position of the moving object 500, specifically, the position on the ground along which the moving object 500 is traveling based on the inertial navigation positioning data and the GPS positioning data. For example, even when the GPS positioning data shows a single position of the moving object 500, but the attitude of the moving object 500 varies due to inclination (θ) of the ground and other factors, as shown in FIG. 18, the position on the ground along which the moving object 500 is traveling varies. An accurate position of the moving object 500 cannot therefore be calculated based only on the GPS positioning data. In this case, the processing apparatus 530 uses data particularly on the attitude of the moving object 500 out of the inertial navigation positioning data to calculate the position on the ground along which the moving object 500 is traveling.

The control apparatus 570 controls the driving mechanism 580, the braking mechanism 582, and the steering mechanism 584 of the moving object 500. The control apparatus 570 is a controller for vehicle control and performs a variety of types of control, such as vehicle control and automatic driving control.

The moving object 500 according to the present embodiment includes the inertial measurement unit 10 and the processing apparatus 530. The processing apparatus 530 performs the variety of types of processing described above based on the result of the measurement performed by the inertial measurement unit 10 to determine information on the position and attitude of the moving object 500. For example, the information on the position of the moving object 500 can be determined based on the GPS positioning data and the inertial navigation positioning data, as described above. The information on the attitude of the moving object 500 can be determined based, for example, on the angular velocity data contained in the inertial navigation positioning data. The control apparatus 570 then controls the attitude of the moving object 500 based, for example, on the information on the attitude of the moving object 500 determined in the process carried out by the processing apparatus 530. The attitude control can be achieved, for example, by the control apparatus 570 that controls the steering mechanism 584. Instead, to stabilize the attitude of the moving object 500, such as slip control, the control apparatus 570 may control the driving mechanism 580 or the braking mechanism 582. According to the present embodiment, the information on the attitude determined from the output signal from the inertial measurement unit 10 can be accurately determined, whereby the attitude and other parameters of the moving object 500 can be appropriately controlled. Further, in the present embodiment, automatic driving control can be performed on the moving object 500. In the automatic driving control, the result of monitoring an object around the moving object 500, map information, traveling route information, and other pieces of information are used in addition to the information on the position and attitude of the moving object 500.

As described above, the inertial measurement unit according to the present embodiment includes a sensor module including at least one inertial sensor and a printed substrate on which the inertia sensor is provided, and a lead group that is provided as a support member for supporting the printed substrate on an attachment surface. Leads of the lead group each have a first section coupled to the attachment surface, a second section extending from the first section toward the printed substrate in a direction that intersects the attachment surface, and a third section coupled to the printed substrate.

According to the present embodiment, the lead group, which functions as the support member, can be used to support the printed substrate of the sensor module, in which the inertia sensor is provided. The leads of the lead group each have the first section, which is coupled to the attachment surface, the third section, which is coupled to the printed substrate, and the second section, which extends toward the printed substrate in a direction that intersect the attachment surface. The lead group can therefore reduce the stress induced by the difference in the coefficient of linear expansion. Deterioration of the sensor characteristics of the inertial sensor and deterioration of the mounting reliability due to the stress resulting from the difference in the coefficient of linear expansion can therefore be suppressed. The inertial measurement unit can therefore be so provided that the sensor module including an inertial sensor can be appropriately mounted with deterioration of the sensor characteristics of the inertial sensor and deterioration of the mounting reliability resulting from the difference in the coefficient of linear expansion suppressed.

In the present embodiment, the inertial measurement unit may further include, as the lead group, a first lead group provided in correspondence with a first edge of the printed substrate and a second lead group provided in correspondence with a second edge of the printed substrate that is the edge facing the first edge.

Therefore, the first lead group can support the first edge of the printed substrate, and the lead group can support the second edge of the printed substrate. Even when stress is induced in the direction, for example, from the first edge toward the second edge due to the difference in the coefficient of linear expansion, the stress can be appropriately reduced.

In the present embodiment, the inertial measurement unit may further include, as the lead group, a third lead group provided in correspondence with a third edge of the printed substrate that is the edge that intersects the first and second edges and a fourth lead group provided in correspondence with a fourth edge of the printed substrate that is the edge facing the third edge.

The first, second, third, and fourth lead groups can thus support the locations of the printed substrate that correspond to the first, second, third, and fourth edges. Even when stress is induced in the printed substrate, for example, in the direction from the first edge toward the second edge or in the direction from the third edge toward the fourth edge due to the difference in the coefficient of linear expansion, the stress can be appropriately reduced.

In the present embodiment, the leads may each be a gullwing-type lead, and the third section of each of the leads may be coupled to a second surface of the printed substrate that is the surface opposite a first surface of the printed substrate that is the surface on which the inertial sensor is provided.

Using gullwing-type leads allows the second section of each of the gullwing-type leads to be deformed or otherwise changed to reduce the stress resulting from the difference in the coefficient of linear expansion, whereby deterioration of the sensor characteristics and deterioration of the mounting reliability can be suppressed.

In the present embodiment, the leads may each be a J-lead-type lead, and the third section of each of the J-lead-type leads may be coupled to the first surface of the printed substrate, which is the surface on which the inertial sensor is provided, or the side surface of the printed substrate.

Using the thus configured J-lead-type leads allows the second section of each of the J-lead-type leads to be deformed or otherwise changed to reduce the stress resulting from the difference in the coefficient of linear expansion, whereby deterioration of the sensor characteristics and deterioration of the mounting reliability can be suppressed.

In the present embodiment, the leads may be coupled to external connection terminals on the printed substrate, and the width of each of the external connection terminal is greater than the width of the third section of each of the leads in a plan view viewed along the direction perpendicular to a surface of the printed substrate that is the surface on which the external connection terminals are provided.

The mounting reliability of the coupling between the external connection terminals on the printed substrate and the third sections of the leads can thus be improved.

In the present embodiment, a hole may be provided in each of the third sections.

Providing the holes can increase the mounting area over which the third sections are coupled to the external connection terminals, whereby the mounting reliability can be further improved.

In the present embodiment, the width of the third sections may larger than the width of the second sections.

The mounting area at the portion where the third sections are each therefore bonded to the corresponding external connection terminals increase, whereby the third sections of the leads can be coupled to the external connection terminals with high reliability.

In the present embodiment, the third sections of the leads may be coupled to the external connection terminals on the printed substrate with solder.

The third sections of the leads can thus be coupled to the external connection terminals on the printed substrate based on highly reliable mounting using solder.

In the present embodiment, the third sections may be coupled to the external connection terminals with solder having a melting point higher than 220 degrees.

Therefore, for example, even when the first sections of the leads are coupled by reflowing to the attachment surface with solder, the situation in which the heat generated by the reflowing causes defective solder bonding at the portions where the third sections are bonded to the external connection terminals can be avoided.

In the present embodiment, the third sections of the leads may be coupled to the external connection terminals on the printed substrate with a brazing material.

Therefore, for example, even when the first sections of the leads are coupled by reflowing to the attachment surface with solder, the situation in which the heat generated by the reflowing causes defective solder bonding at the portions where the third sections are bonded to the external connection terminals can be avoided.

In the present embodiment, the lead group may include a first lead and a second lead, and the width of the third section of the second lead may be larger than the width of the third section of the first lead.

The larger width of the third section of the second lead therefore allows the third section of the second lead to be coupled to the corresponding external connection terminal over a greater mounting area, whereby the mounting reliability can be improved even in a situation in which stress acts on the portion where the third section of the second lead is bonded to the external connection terminal.

In the present embodiment, the lead group may further include a third lead, and the third lead adjacent to the second lead and having the same potential as that at the second lead may be coupled to the third section of the second lead.

The third section shared by the second and third leads can therefore be used to couple the second and third leads to the corresponding external connection terminal on the printed substrate, resulting in an increase in the mounting area, whereby the mounting reliability at the portion where the third section is bonded to the external connection terminal can be improved.

In the present embodiment, the distance from a corner of the printed substrate to the second lead may be smaller than the distance from the corner of the printed substrate to the first lead.

The width of the third section of the second lead is therefore increased, and the mounting area increases accordingly, whereby the mounting reliability at the portion where the third section is bonded to the corresponding external connection terminal can be improved even when large stress acts on the third section, which is located in the vicinity of the corner of the printed substrate.

In the present embodiment, the height of the lead group in the side view of the printed substrate may be at least 1.7 mm and may be smaller than the overall length of each of the leads.

Therefore, the stress acting on the mounted portion can be optimally reduced, and the mounting reliability can be improved with the size of the inertial measurement unit reduced.

In the present embodiment, the length of the third section in the direction in which the leads extend may be greater than the length of the first section.

The longer length of the third section of each of the leads as described above increases the mounting area of the bonding portion at the third section, whereby the mounting reliability can be improved.

In the present embodiment, the printed substrate may be a ceramic substrate, and the inertial sensor may be an inertial sensor accommodated in a ceramic package.

The difference in the coefficient of linear expansion between the package of the inertial sensor and the printed substrate can thus be reduced, whereby deterioration of the detection characteristics of the inertial sensor and a decrease in the reliability of mounting the inertial sensor on the printed substrate due to the stress resulting from the difference in the coefficient of linear expansion can be suppressed.

In the present embodiment, the printed substrate may be a resin substrate, the inertial sensor may be an inertial sensor accommodated in a ceramic package, and the difference in the coefficient of linear expansion between the resin substrate and the ceramic package may be smaller than or equal to 30%.

The difference in the coefficient of linear expansion between the package of the inertial sensor and the printed substrate can thus be reduced, whereby deterioration of the detection characteristics of the inertial sensor and a decrease in the reliability of mounting the inertial sensor on the printed substrate due to the stress resulting from the difference in the coefficient of linear expansion can be suppressed.

The present embodiment further relates to an electronic instrument including the inertial measurement unit described above and a processing apparatus that carries out processes based on the result of the measurement performed by the inertial measurement unit.

The present embodiment further relates to a moving object including the inertial measurement unit described above and a processing apparatus that carries out processes based on the result of the measurement performed by the inertial measurement unit.

The present embodiment has been described above in detail, and a person skilled in the art will readily appreciate that a large number of variations are conceivable to the extent that they do not substantially depart from the novel items and advantageous effects of the present disclosure. Such variations are all therefore assumed to fall within the scope of the present disclosure. For example, a term described at least once in the specification or the drawings along with a different term having a broader meaning or the same meaning can be replaced with the different term anywhere in the specification or the drawings. Further, any combination of the present embodiment and the variations fall within the scope of the present disclosure. Moreover, the configuration, operation, and other factors of each of the inertial measurement unit, the electronic instrument, and the moving object are not limited to those described in the present embodiment, and a variety of changes can be made thereto.

What is claimed is:

1. An inertial measurement unit comprising:
    a sensor module including at least one inertial sensor and a printed substrate on which the at least one inertia sensor is directly provided; and
    a lead group provided as a support member for supporting the printed substrate on an attachment surface, the attachment surface facing a bottom surface of the printed substrate,
    wherein leads of the lead group each have:
        a first section coupled to the attachment surface;
        a second section extending from the first section toward the printed substrate in a direction that intersects the attachment surface; and
        a third section coupled to the printed substrate,
    the at least one inertial sensor includes a MEMS capacitance-type sensor,
    the lead group includes a first lead, a second lead, and a third lead,
    a width of the third section of the second lead is larger than a width of the third section of the first lead,
    the third lead is located adjacent to the second lead,
    the third section of the third lead is coupled to the third section of the second lead, and
    a potential applied to the third lead and a potential applied to the second lead are the same.

2. The inertial measurement unit according to claim 1, wherein the printed substrate has a first edge and a second edge outwardly opposite to each other, and
    the lead group is configured with:
        a first lead group provided at the first edge of the printed substrate; and
        a second lead group provided at the second edge of the printed substrate.

3. The inertial measurement unit according to claim 2, wherein the printed substrate has a third edge and a fourth edge outwardly opposite to each other, and each of the third and fourth edges intersects each of the first and second edges, and
    the lead group is configured with:
        a third lead group provided at the third edge of the printed substrate; and
        a fourth lead group provided at the fourth edge of the printed substrate.

4. The inertial measurement unit according to claim 1, wherein the MEMS capacitance-type sensor is provided on a top surface of the printed substrate, and the top surface is outwardly opposite to the bottom surface of the printed substrate,
    each of the leads is a gullwing-type lead, and
    the third section of each of the leads is coupled to the bottom surface of the printed substrate.

5. The inertial measurement unit according to claim 1, wherein the MEMS capacitance-type sensor is provided on a top surface of the printed substrate, and the top surface is outwardly opposite to the bottom surface of the printed substrate, each of the leads is a J-lead-type lead, and
the third section of each of the J-lead-type leads is coupled to the bottom surface of the printed substrate or a side surface of the printed substrate.

6. The inertial measurement unit according to claim 1,
wherein the leads are coupled to external connection terminals on the printed substrate, and
a width of a corresponding one of the external connection terminals is greater than a width of the third section of a corresponding one of the leads.

7. The inertial measurement unit according to claim 1,
wherein a hole is provided in each of the third sections.

8. The inertial measurement unit according to claim 1,
wherein a width of each of the third sections is larger than a width of each of the second sections.

9. The inertial measurement unit according to claim 1,
wherein the third sections of the leads are respectively coupled to external connection terminals on the printed substrate with solder.

10. The inertial measurement unit according to claim 9,
wherein the third sections are respectively coupled to the external connection terminals with the solder having a melting point higher than 220 degrees.

11. The inertial measurement unit according to claim 1,
wherein the third sections of the leads are respectively coupled to external connection terminals on the printed substrate with a brazing material.

12. The inertial measurement unit according to claim 1,
wherein a distance from a corner of the printed substrate to the second lead is smaller than a distance from the corner of the printed substrate to the first lead.

13. The inertial measurement unit according to claim 1,
wherein a distance between the bottom surface of the printed substrate and the attachment surface is smaller than an overall length of each of the leads.

14. The inertial measurement unit according to claim 1,
wherein a length of the third section is greater than a length of the first section.

15. The inertial measurement unit according to claim 1,
wherein the printed substrate is a ceramic substrate, and
the MEMS capacitance-type sensor is accommodated in a ceramic package.

16. The inertial measurement unit according to claim 1,
wherein the printed substrate is a resin substrate,
the MEMS capacitance-type sensor is accommodated in a ceramic package, and
a difference in a coefficient of linear expansion between the resin substrate and the ceramic package is smaller than or equal to 30%.

17. An electronic instrument comprising:
the inertial measurement unit according to claim 1; and
a processing apparatus configured to perform processes based on a result of measurement performed by the inertial measurement unit.

18. A moving object comprising:
the inertial measurement unit according to claim 1; and
a processing apparatus configured to perform processes based on a result of measurement performed by the inertial measurement unit.

19. The inertial measurement unit according to claim 1,
wherein a distance between the bottom surface of the printed substrate and the attachment surface is equal to or more than 1.7 mm.

* * * * *